(12) United States Patent
Conger et al.

(10) Patent No.: US 10,367,281 B2
(45) Date of Patent: Jul. 30, 2019

(54) VEHICLE CAMERA WITH CONNECTOR SYSTEM FOR HIGH SPEED TRANSMISSION

(71) Applicant: MAGNA ELECTRONICS INC., Auburn Hills, MI (US)

(72) Inventors: Jonathan D. Conger, Berkley, MI (US); Steven V. Byrne, Goodrich, MI (US); Nazar F. Bally, Sterling Heights, MI (US); Achim Newiger, Aschaffenburg (DE); Christian Mai, Grossostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/186,867

(22) Filed: Nov. 12, 2018

(65) Prior Publication Data

US 2019/0081423 A1    Mar. 14, 2019

Related U.S. Application Data

(63) Continuation of application No. 15/062,524, filed on Mar. 7, 2016, now Pat. No. 10,128,595.

(Continued)

(51) Int. Cl.
*H04N 5/225* (2006.01)
*H04N 7/18* (2006.01)
(Continued)

(52) U.S. Cl.
CPC ......... *H01R 12/716* (2013.01); *H01R 9/0518* (2013.01); *H01R 27/02* (2013.01); *H04N 7/18* (2013.01); *H01R 12/714* (2013.01); *H01R 13/2421* (2013.01); *H01R 13/652* (2013.01); *H01R 13/6583* (2013.01); *H01R 13/6594* (2013.01); *H01R 13/6597* (2013.01);
(Continued)

(58) Field of Classification Search
CPC .............. H01R 2201/26; H01R 12/716; H01R 9/0518; H01R 2103/00; H01R 24/50; H04N 7/18
USPC .......... 348/148, 153, 139, 156, 159, 208.14, 348/825; 439/63, 581
See application file for complete search history.

(56) References Cited

U.S. PATENT DOCUMENTS 5,550,677 A    8/1996   Schofield et al.
5,670,935 A    9/1997   Schofield et al.
(Continued)

*Primary Examiner* — Jefferey F Harold
*Assistant Examiner* — Jean W Desir
(74) *Attorney, Agent, or Firm* — Honigman LLP

(57) ABSTRACT

A camera for a vehicular vision system includes a front housing portion, a circuit board and a rear housing portion. The front housing portion includes a lens and the rear housing portion includes a coaxial connecting element for electrically connecting to a vehicle cable. The coaxial connecting element includes a first coaxial cable connector at a first end of the coaxial connecting element that extends outward from the outer side of the rear housing portion and a second coaxial cable connector at a second end of the coaxial connecting element that extends inward from the inner side of the rear housing portion. The circuit board has a third coaxial cable connector established thereat. As the rear housing portion is mated with the front housing portion, the second coaxial cable connector engages the third coaxial cable connector to electrically connect the coaxial connecting element with circuitry at the circuit board.

30 Claims, 43 Drawing Sheets

Related U.S. Application Data

(60) Provisional application No. 62/217,118, filed on Sep. 11, 2015, provisional application No. 62/204,166, filed on Aug. 12, 2015, provisional application No. 62/164,619, filed on May 21, 2015, provisional application No. 62/154,396, filed on Apr. 29, 2015, provisional application No. 62/130,130, filed on Mar. 9, 2015.

(51) Int. Cl.
| | |
|---|---|
| *H01R 12/71* | (2011.01) |
| *H01R 9/05* | (2006.01) |
| *H01R 27/02* | (2006.01) |
| H01R 24/50 | (2011.01) |
| H01R 13/652 | (2006.01) |
| H01R 13/6594 | (2011.01) |
| H01R 103/00 | (2006.01) |
| H01R 13/24 | (2006.01) |
| H01R 13/6583 | (2011.01) |
| H01R 13/6597 | (2011.01) |
| H01R 101/00 | (2006.01) |

(52) U.S. Cl.
CPC .......... *H01R 24/50* (2013.01); *H01R 2101/00* (2013.01); *H01R 2103/00* (2013.01); *H01R 2201/26* (2013.01)

(56) References Cited

U.S. PATENT DOCUMENTS

| | | |
|---|---|---|
| 5,949,331 A | 9/1999 | Schofield et al. |
| 7,965,336 B2 | 6/2011 | Bingle et al. |
| 8,503,061 B2 | 8/2013 | Uken et al. |
| 8,542,451 B2 | 9/2013 | Lu et al. |
| 8,866,907 B2 | 10/2014 | McElroy et al. |
| 9,233,641 B2 | 1/2016 | Sesti et al. |
| 9,565,342 B2 | 2/2017 | Sauer et al. |
| 9,609,757 B2 | 3/2017 | Steigerwald |
| 10,128,595 B2 * | 11/2018 | Conger ................ H01R 12/716 |
| 2011/0310248 A1 | 12/2011 | McElroy et al. |
| 2013/0222595 A1 | 8/2013 | Gebauer et al. |
| 2013/0242099 A1 | 9/2013 | Sauer et al. |
| 2013/0328672 A1 | 12/2013 | Sesti et al. |
| 2013/0344736 A1 | 12/2013 | Latunski |
| 2014/0138140 A1 | 5/2014 | Sigle |
| 2014/0320636 A1 | 10/2014 | Bally et al. |
| 2014/0362209 A1 | 12/2014 | Ziegenspeck et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2017/0133811 A1 | 5/2017 | Conger et al. |
| 2017/0271819 A1* | 9/2017 | Hehir ................ H01R 13/6583 |

\* cited by examiner

Prior Art ŒCoaxial Header and Jack

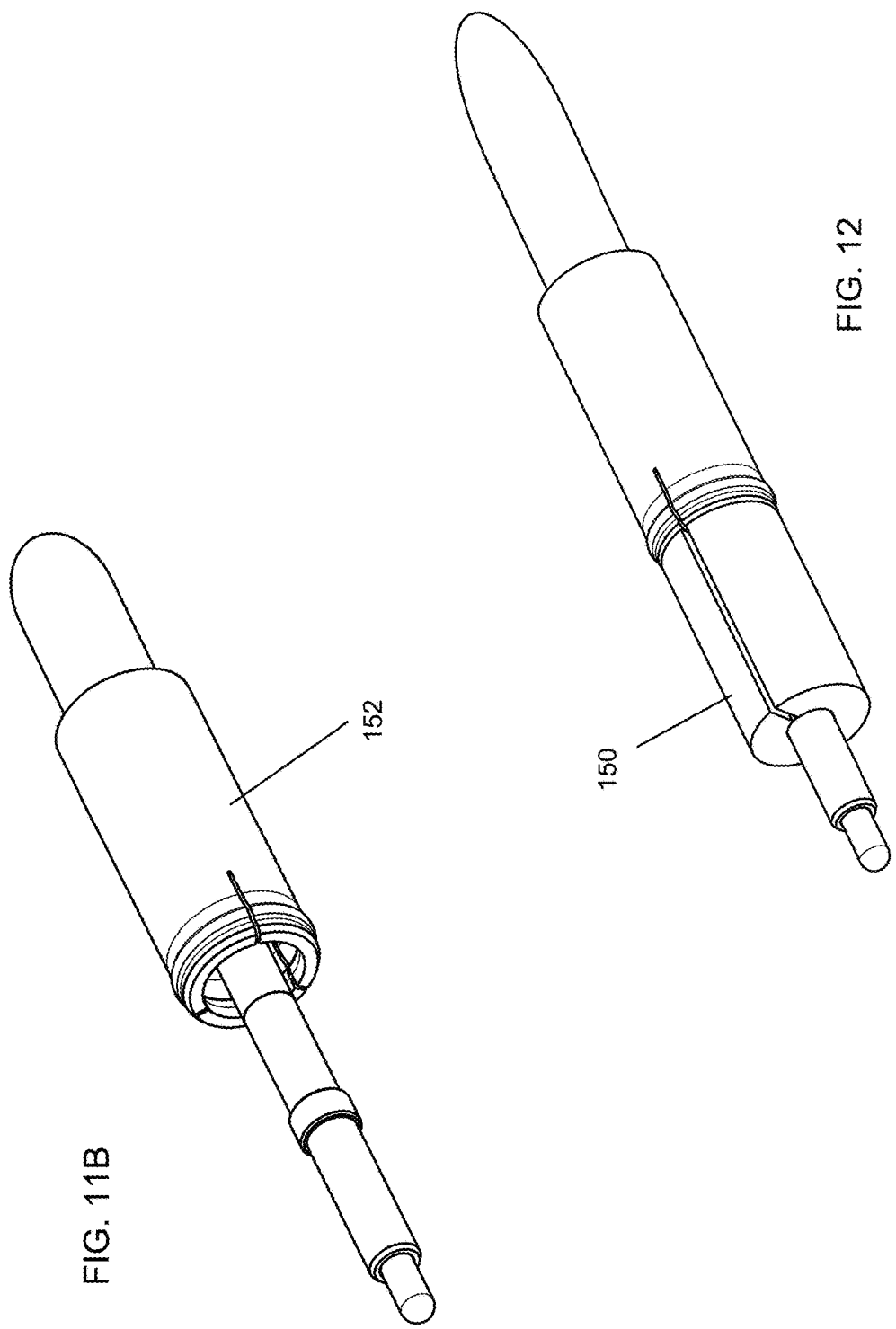

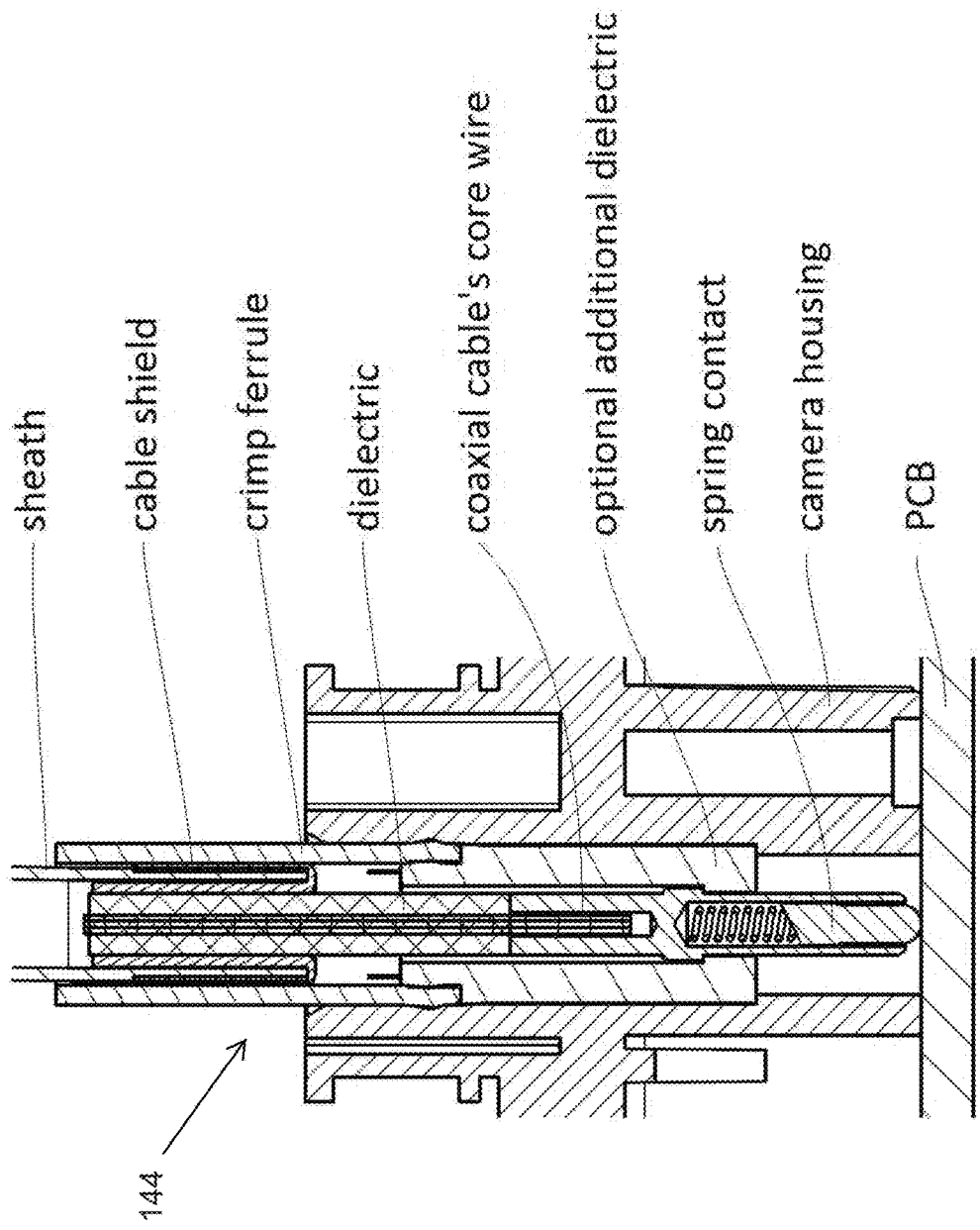

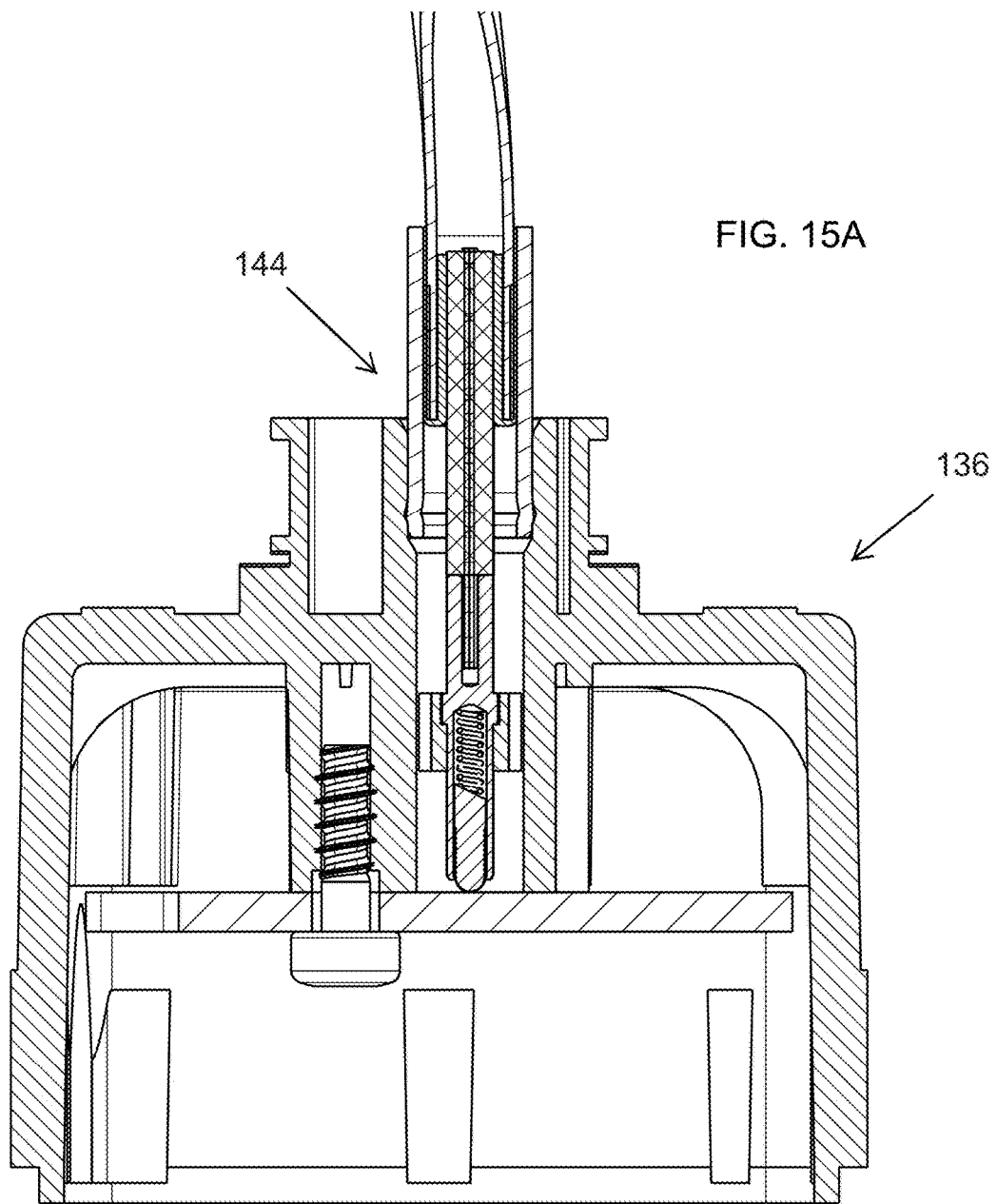

A tube of a dielectric medium sheath and centers the core contact. The crimp ferrule will be used to contact the coax shield with the housing metallization.

coaxial shaft designed with a small interference to have the possibility to contact the coax shield directly with PCB

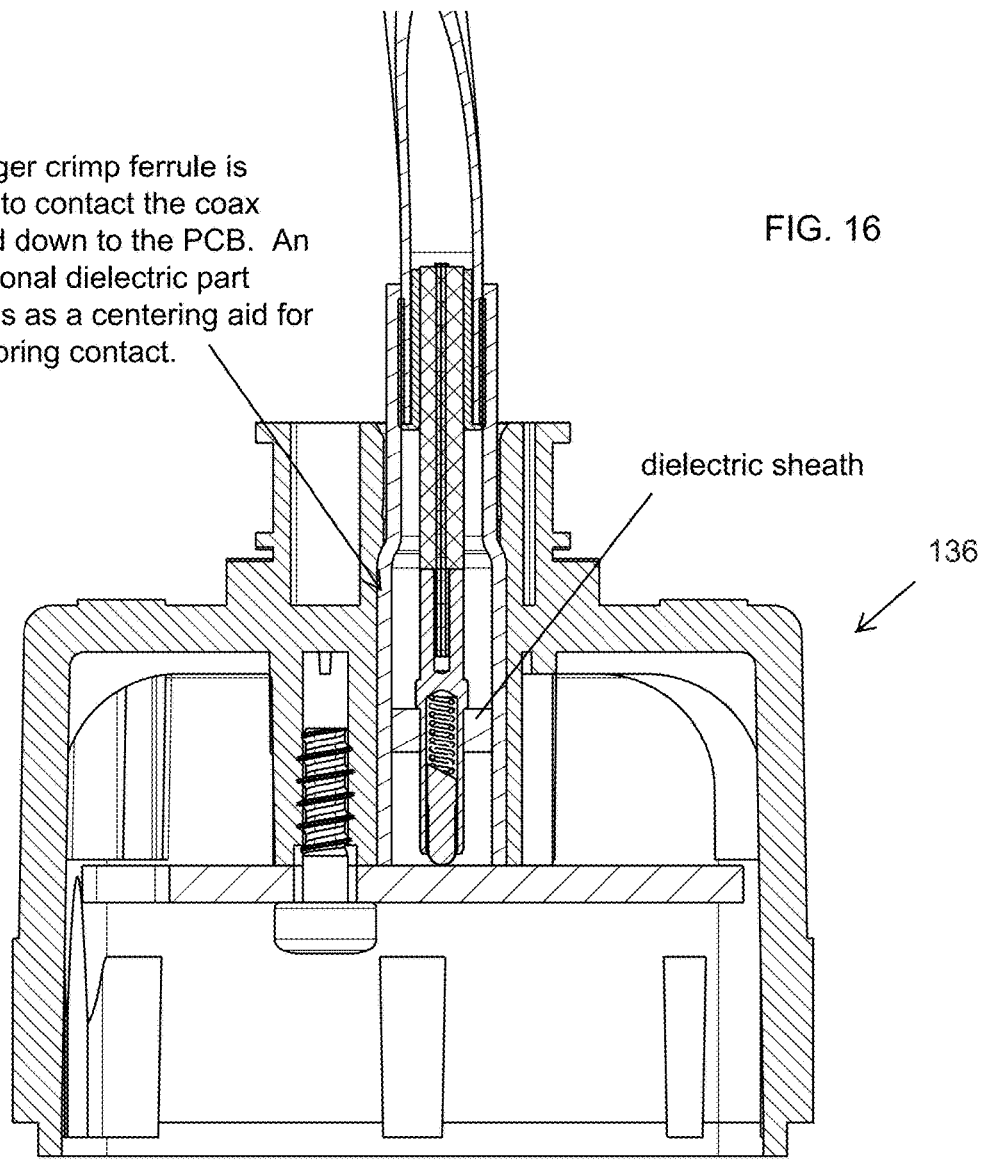

VEHICLE CAMERA WITH CONNECTOR SYSTEM FOR HIGH SPEED TRANSMISSION

CROSS REFERENCE TO RELATED APPLICATIONS

The present application is a continuation of U.S. patent application Ser. No. 15/062,524, filed Mar. 7, 2016, now U.S. Pat. No. 10,128,595, which claims the filing benefits of U.S. provisional applications, Ser. No. 62/217,118, filed Sep. 11, 2015, Ser. No. 62/204,166, filed Aug. 12, 2015, Ser. No. 62/164,619, filed May 21, 2015, Ser. No. 62/154,396, filed Apr. 29, 2015, and Ser. No. 62/130,130, filed Mar. 9, 2015, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. In high speed digital data transmission in automotive applications, such as sensors or displays or infotainment systems, shielded coaxial cable is used for its excellent isolation of the signal and ground path from each other, and from electromagnetic interference (EMI) issues with adjacent electrical components. The device's PCB typically contains a coaxial header as shown in FIG. 1, and the device's housing would have a mating jack to engage this header. This method of connection to the PCB requires intricate machining, casting, or stamping operations which increase cost and reduce design flexibility.

SUMMARY OF THE INVENTION

The present invention provides a vision system or imaging system for a vehicle that utilizes one or more cameras (preferably one or more CMOS cameras) to capture image data representative of images exterior of the vehicle, and provides enhanced electrical connection between a coaxial connector and circuitry of a printed circuit board of the camera. The connection of the present invention provides a ground clamp that clamps to ground pins of the connector portion of the housing of the camera and that clamps to a ground shield at the header of the printed circuit board when the camera is assembled. The connection thus provides enhanced grounding and enhanced electrical connection of the connector portion to the PCB circuitry, thereby providing enhanced data transmission, such as for high speed data transmission applications.

According to an aspect of the present invention, a camera for a vision system of a vehicle includes a front housing portion having a lens barrel or lens holder and a rear housing portion having a connector for connecting to a coaxial vehicle wire harness when the camera is disposed at the vehicle. The connector comprises a signal pin and at least one ground pin or contact (such as two ground pins or contacts, one at each side of the signal pin). The rear housing portion includes a clamping element in electrically conductive connection with the ground pins and electrically isolated from the signal pin. The camera includes a circuit element (such as a printed circuit board or PCB at the front housing portion) having circuitry established thereat. The circuit element comprises a connector header and an electrically conductive shield disposed at least partially around the connector header and in electrical connection with circuitry of the circuit element (such as via soldering of the connector header at circuitry or traces of the circuit element). The clamping element is configured to engage the electrically conductive shield when the signal pin and the ground pins engage the connector header during assembly of the camera, and wherein connection of the clamping element and the electrically conductive shield provides enhanced grounding of the ground pins of the connector with circuitry of the circuit element.

These and other objects, advantages, purposes and features of the present invention will become apparent upon review of the following specification in conjunction with the drawings.

BRIEF DESCRIPTION OF THE DRAWINGS

FIG. 11B shows a coaxial cable with the spring loaded telescopic pin (pre-) assembled to the coaxial cable's core pin and the crimp ferrule applied to the coaxial shield without the additional dielectric element;

FIG. 12 shows the coaxial cable of FIG. 11B with the dielectric element added (in preassembly) which holds the core pin centered when inserted to the camera core pin channel;

FIG. 13B is an enlarged sectional view of the cable assembly and connection of FIG. 13A;

FIG. 15A is a sectional view of a camera's rear housing structure using a coaxial cable interface in accordance with the present invention, having a spring loaded pin (pogo pin) and a sheath as dielectric and for centering the core pin;

FIG. 16 is a sectional view of an alternative crimp ferrule which extends over the full length for acting as an uninterrupted shield, with a sheath as dielectric and for centering the core pin;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
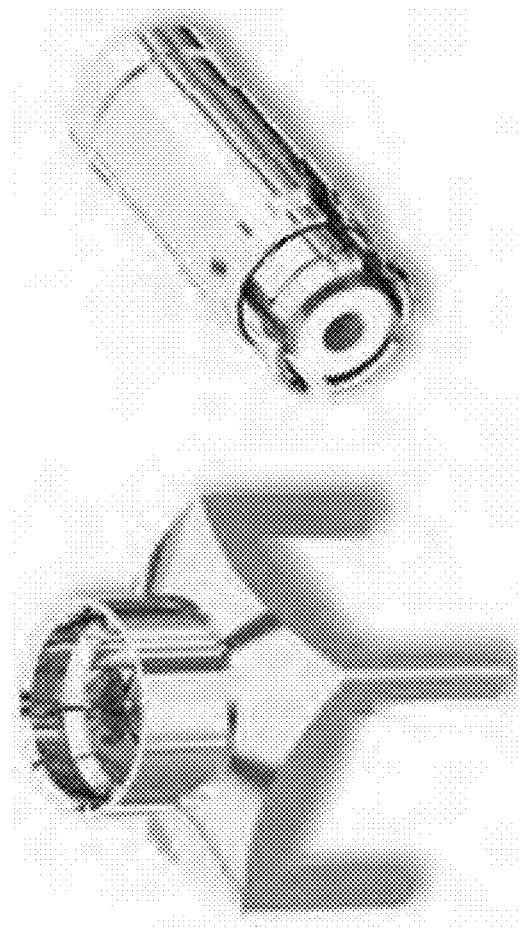
FIG. 1 is a prior art coaxial connector.
Figure 2:
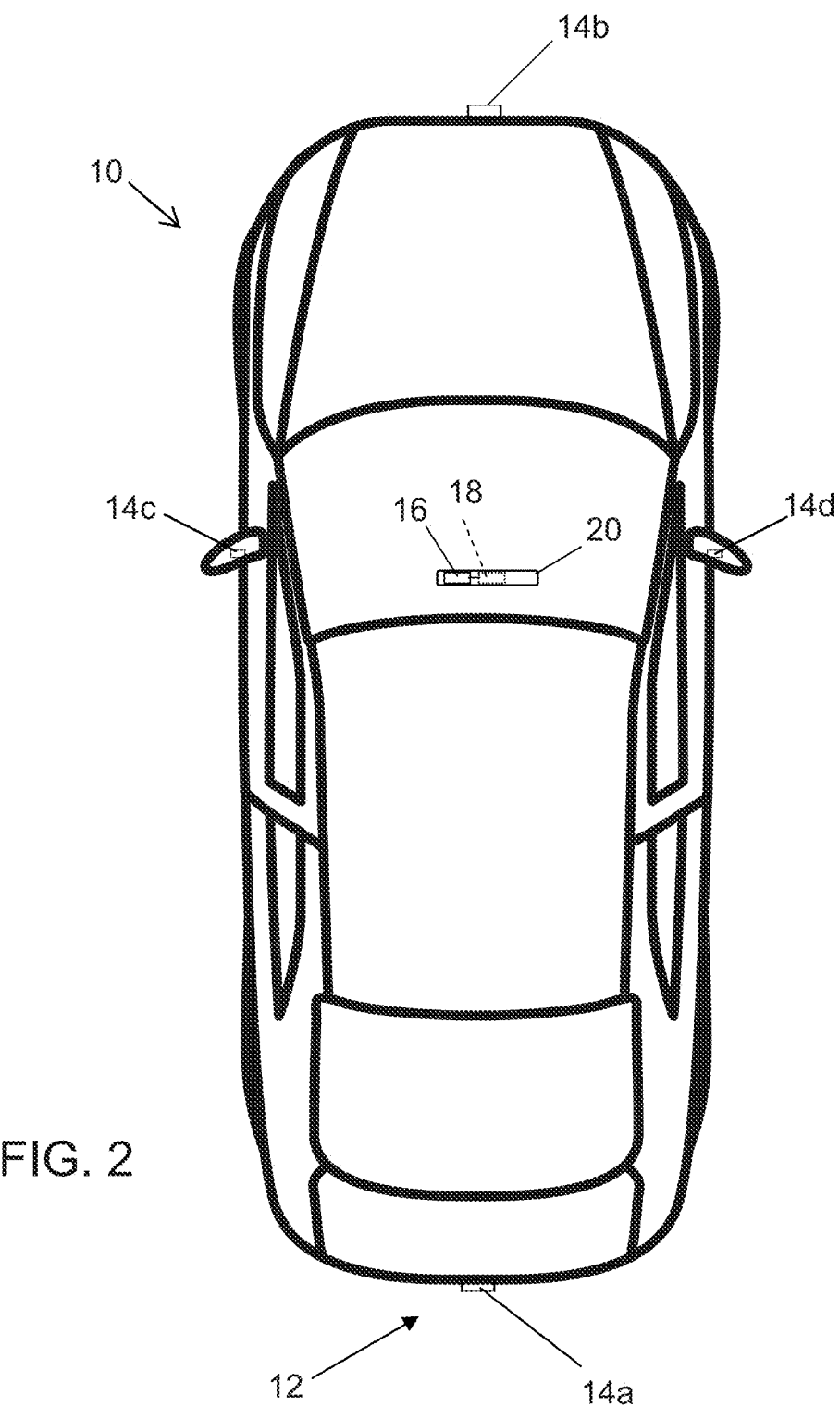
FIG. 2 is a plan view of a vehicle with a vision system that incorporates cameras in accordance with the present invention.
Figure 2A:
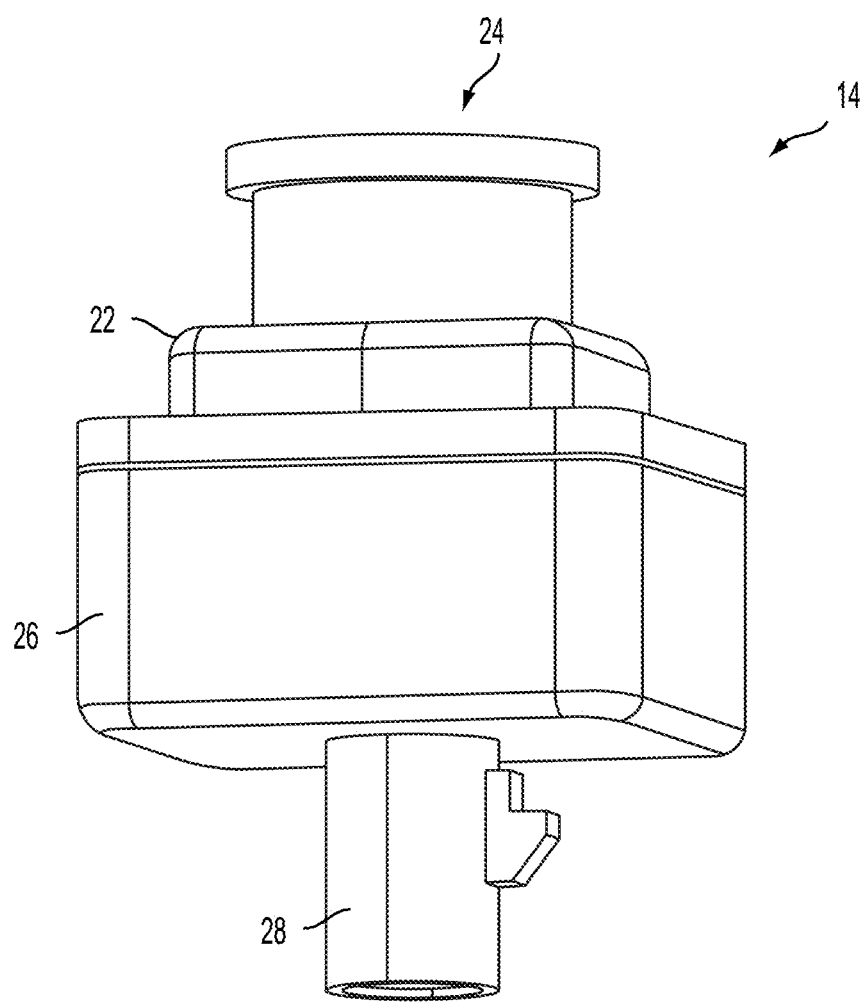
FIG. 2A is a perspective view of a camera in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 2). The vision system 12 includes a control or electronic control unit (ECU) or processor 18 that is operable to process image data captured by the cameras and may provide displayed images at a display device 16 for viewing by the driver of the vehicle (although shown in FIG. 2 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. As shown in FIG. 2A, the camera 14 includes a first or front housing portion 22 that includes a lens or lens assembly 24, and further includes a second or rear housing portion 26 that has a connector portion 28 for electrically connecting to or receiving one or more connecting ends of wires of the vehicle when the camera is disposed at a vehicle, as discussed below.

In accordance with the present invention, the data transfer is made via a coaxial connection to circuitry of the camera or control. Low speed analog transmissions may be handled by discrete wires which are routed to individual pin headers (such as by utilizing aspects of the systems described in U.S. Publication No. US-2013-0328672, which is hereby incorporated herein by reference in its entirety). These pin headers are commonly available, and may be manufactured with simple low cost components. When attempting to transmit digital signals through this type of header, the transmission may be compromised due to EMI or RF Leakage.

The present invention outfits an analog style connector system with novel features to achieve performance on-par with the more expensive coaxial connectors in high speed digital data applications. The connection of the present invention may electrically connect a coaxial wiring connector to a printed circuit board of a device, such as a camera of a vehicle vision system. The connection and camera may utilize aspects of the connections and cameras described in U.S. Pat. No. 8,866,907 and/or U.S. Publication Nos. US-2013-0328672; US-2014-0320636; US-2013-0222595; US-2013-0344736; US-2014-0373345 US-2013-0242099 and/or US-2015-0222795, which are all hereby incorporated herein by reference in their entireties.

Figure 3:
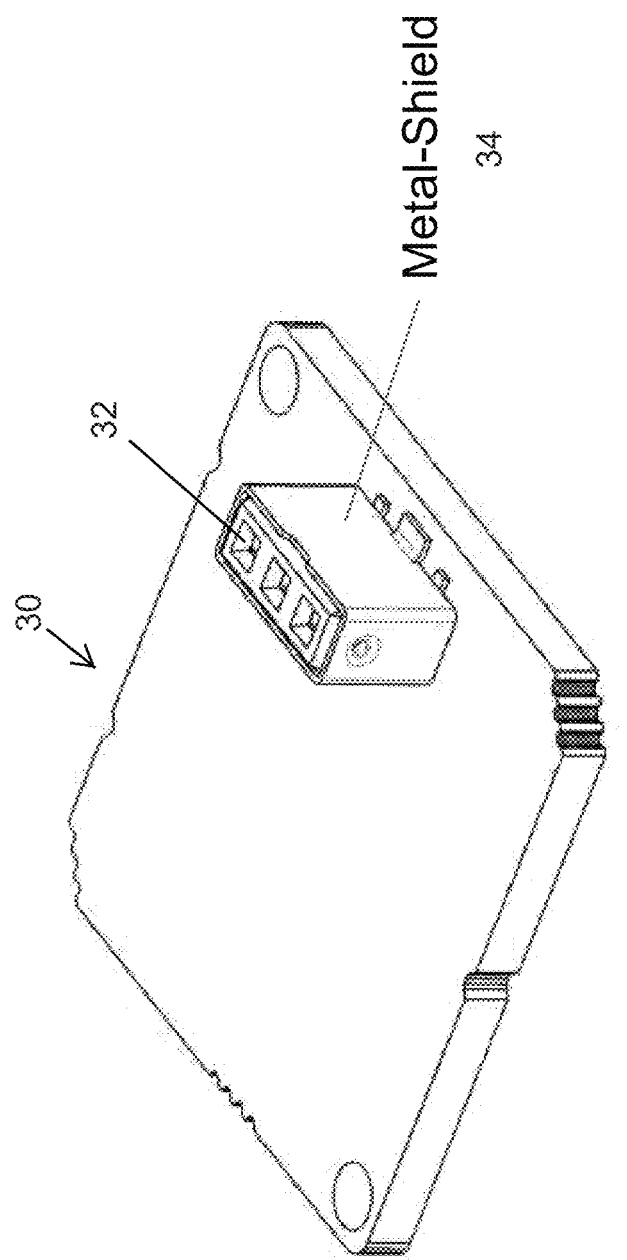
FIG. 3 is a perspective view of a printed circuit board of a device, shown with a metal shield at and at least partially around a header connector in accordance with the present invention.

As shown in FIG. 3, a printed circuit board (PCB) 30 includes an analog header 32 surrounded by a metal header shield 34 that is soldered to the PCB. The metal shield is designed to retain to the header such that the two can be placed in one pick-and-place step in the SMT (surface-mount technology) process as used for stuffing components onto a circuit board during manufacture of electrical circuitry. This component would be made of any conductive material, and may or may not be plated. The printed circuit board includes circuitry of the device, and may include circuitry on both sides of the board or substrate, such as imager circuitry of a camera, where the PCB may be disposed in a camera housing, with a front camera housing including a lens support or barrel and a rear camera housing portion having an electrical connector for connecting to a vehicle wiring harness. The circuit board or boards may be attached at the front or rear housing, and when the camera is assembled together, the connector at the rear camera housing portion makes electrical connection to circuitry or connectors at the rear surface of a rear circuit board of the camera. The circuit board includes circuitry associated with the imager or imaging array, and the circuit board at the connector may be electrically connected (such as via a flexible connector or ribbon cable or the like) to a second or stacked circuit board of the camera, with the second circuit board including the imager or imaging array of the camera or camera module.

Figure 4:
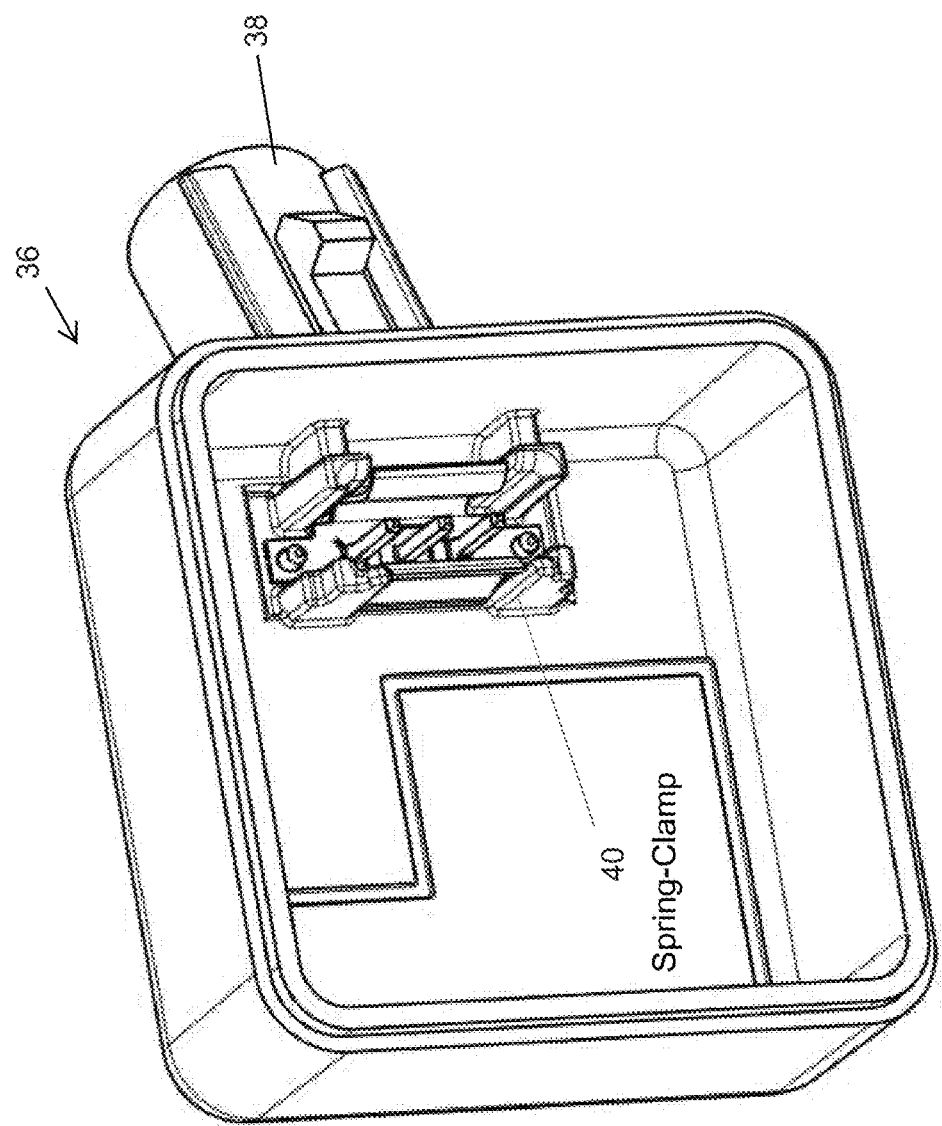
FIG. 4 is a perspective view of a rear housing portion of a device, such as a camera, shown with a spring clamp at the ground pins of the electrical connector of the housing portion in accordance with the present invention.
Figure 5:
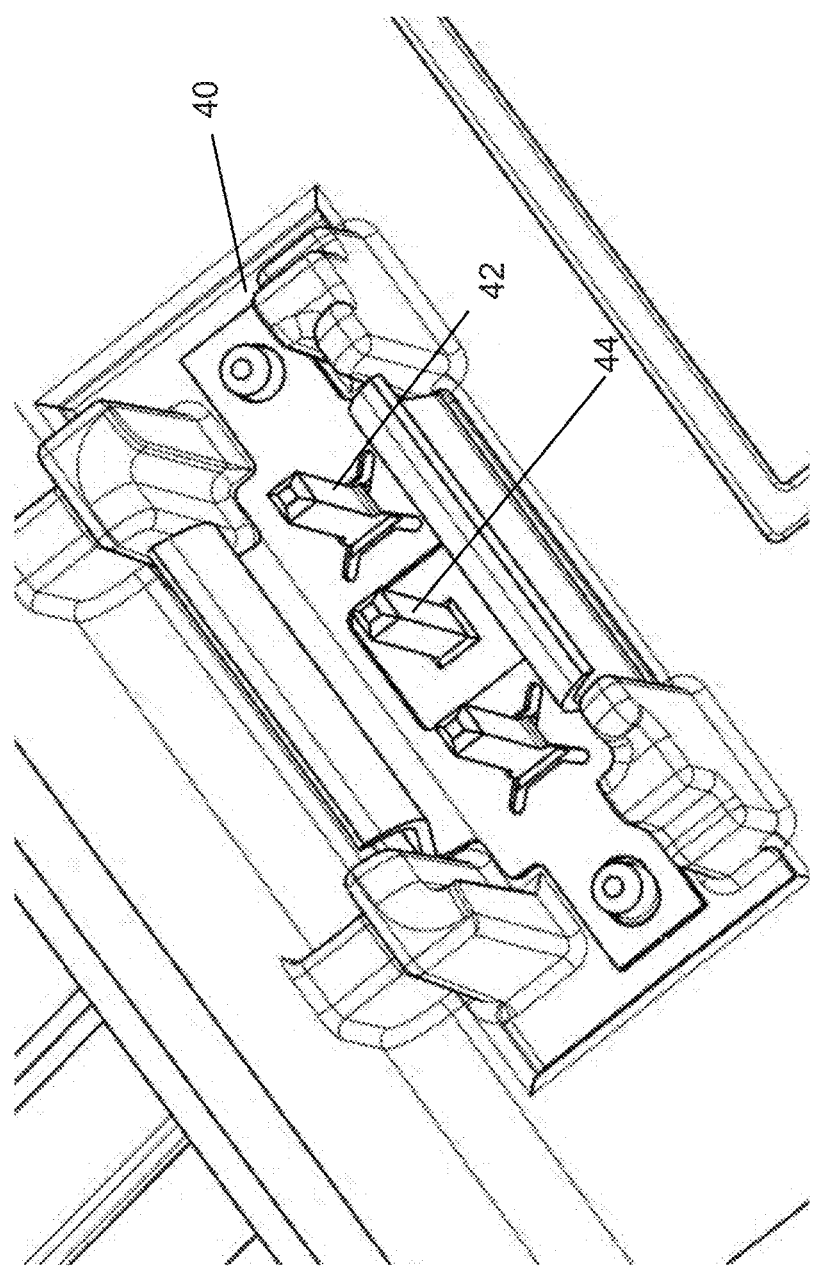
FIG. 5 is an enlarged perspective view of the spring clamp and connector pins of the rear housing portion of FIG. 4.
Figure 6:
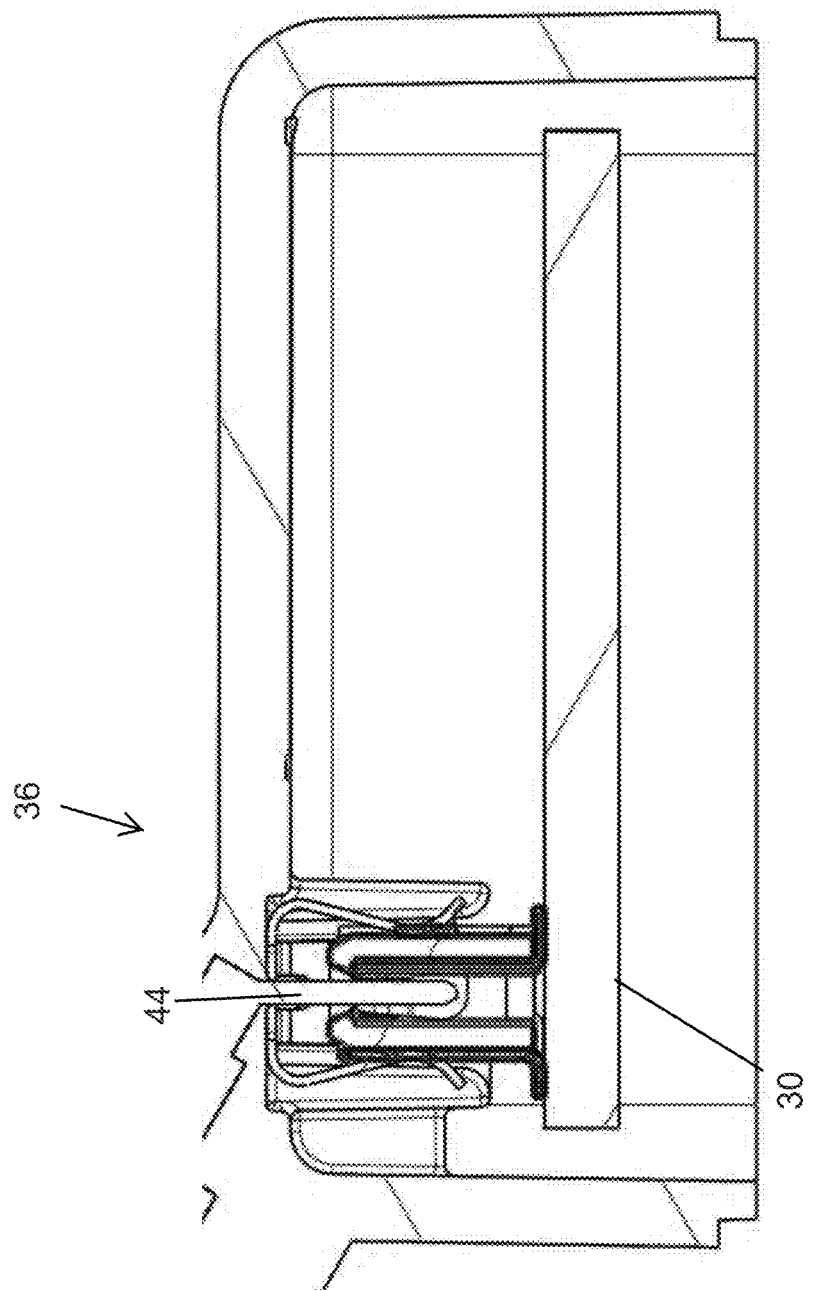
FIG. 6 is a sectional view of the rear housing portion, showing the electrical connection being made between the pins and the header portion and between the spring clamp and the metal shield in accordance with the present invention.
Figure 6A:
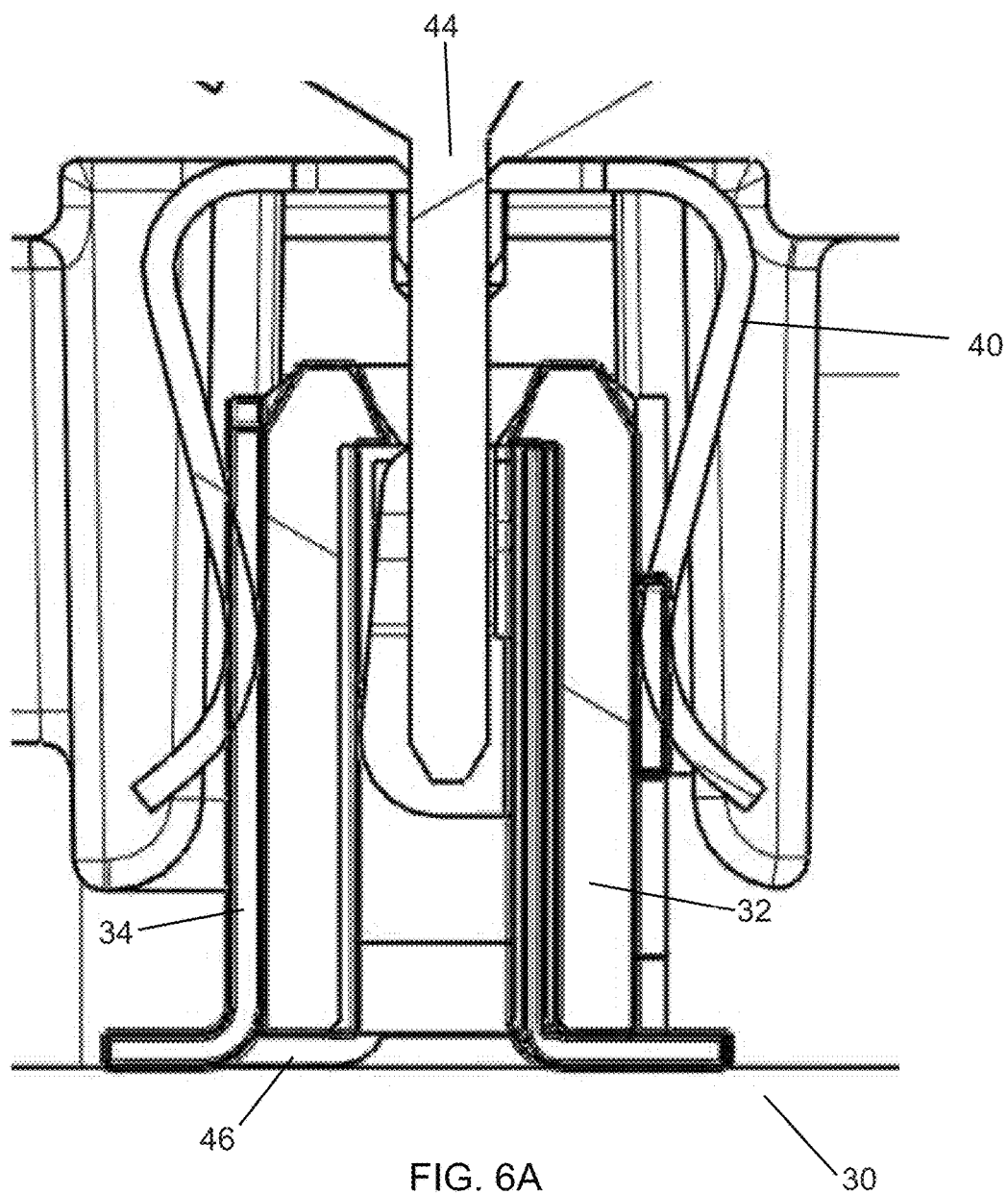
FIG. 6A is an enlarged view of the area A in FIG. 6.
Figure 10:
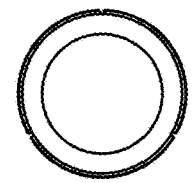
FIG. 10 is a sectional view of the crimp ferrule of FIGS. 7-9.
Figure 9:
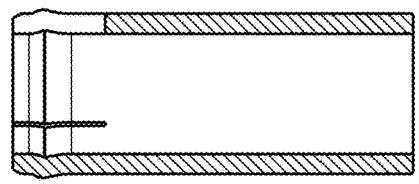
FIGS. 7-9 show different views of the crimp ferrule in accordance with the present invention.
Figure 8:
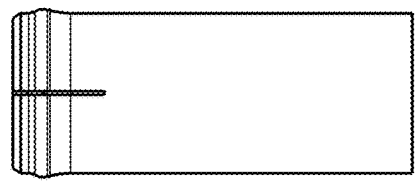
Figure 7:
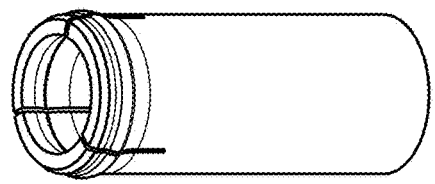

As shown in FIGS. 4 and 5, the rear camera housing portion 36 includes a connecting portion 38 for connecting to a vehicle wiring harness or the like. A spring shield or clamp 40 is disposed at the rear camera housing portion 36 and comprises a series of clamp features which engage the ground pins 42 of the connector of the device, a center hole to avoid the signal pin 44. The spring shield 40 includes clamp features which, when the connector is connected to the header 32 of the PCB 30 (such as shown in FIGS. 6 and 6A), bear against the header shield 34 to create a continuous ground path to the PCB, to shield the center pin 44 in all relative positions of the PCB and housing, and to protect against external EMI. Thus, when the spring shield and connector are pressed into engagement with the PCB header, the pins 42, 44 are received in their respective receivers of the header (such as shown in FIG. 6A, where the signal pin 44 is received in and electrically connects to a receiving portion 46 of the header 32) while the spring shield 40 engages and clamps onto and electrically conductively connects to the header shield 34 at the circuit board 30.

The pin clamps are designed such that the shield can be applied at the rear housing portion and at the ground pins 42 with a press, but provides a high retention force. The clamps that engage the header shield 34 are shaped such that they guide the header into position before the three pins 42, 44 engage the respective parts or receivers of the header 32 at the PCB 30. For example, and such as shown in FIGS. 6 and 6A, the walls of the spring shield 40 are flared or curved outwardly such that any misalignment between the spring shield and the header shield during connection of the parts is accommodated by flexing and guiding of the spring shield walls as the spring shield and header shield are pressed together. The spring shield 40 may be made of any conductive spring material, such as, for example, and not limited to, beryllium copper, phosphor bronze and/or stainless spring steel. Optionally, the spring shield may or may not be plated.

Therefore, the present invention provides a connector with enhanced ground connection between the connector at the rear housing portion and the circuitry at the PCB of the camera or device. The spring clamp is electrically conductively connected to the ground pins of the connector and is configured to flex and clamp onto an electrically conductive shield at and around the header at the PCB when the electrical connector is connected or plugged into the PCB header (such as during assembly of the camera or device). The spring clamp and header shield of the present invention thus provide enhanced electrically conductive connection or ground connection to the circuitry of the PCB, while easing alignment and assembly of the connector to the PCB header during assembly of the camera or device.

Thus, the clamping element may comprise a metallic element that is press fit attached to the ground pins. The clamping element may comprise any suitable number of flexible walls (such as, for example, four flexible walls) that are biased towards a position where the flexible walls engage and clamp onto the electrically conductive shield when the camera is assembled. The flexible walls are preferably configured to guide or align the clamping element with the electrically conductive shield during assembly of the camera.

Optionally, and with reference to FIGS. 7-25, the camera is configured to electrically connect to a coaxial cable connector. Such coaxial cables fulfill various functions, such as for an Ethernet connection. Transmission of video data over coaxial cabling and utilizing the connectors of the present invention has several advantages, including enhanced protection against hacking or corruption due to cyber-attacks and the like on a vehicle equipped with the vehicle cameras and connection system of the present invention. For example, in a surround vision system comprising at least three vehicle cameras, it is preferred to use Ethernet cabling and the connection system of the present invention for transmission of image data captured by the respective video cameras of a vehicular multi-camera surround vision system to a central ECU where video manipulation and image stitching can be performed to generate a composite bird's eye or top view or panoramic view image for display to a driver of the equipped vehicle. Ethernet equipped vision systems that benefit from the vehicle cameras and connecting system of the present invention include systems of the types described in U.S. Pat. Nos. 9,126,525; 9,041,806 and/or U.S. Publication Nos. US-2015-0042807; US-2014-0340510; US-2014-0218535 and/or US-2012-0218412, which are hereby incorporated herein by reference in their entireties.

Figure 11A:
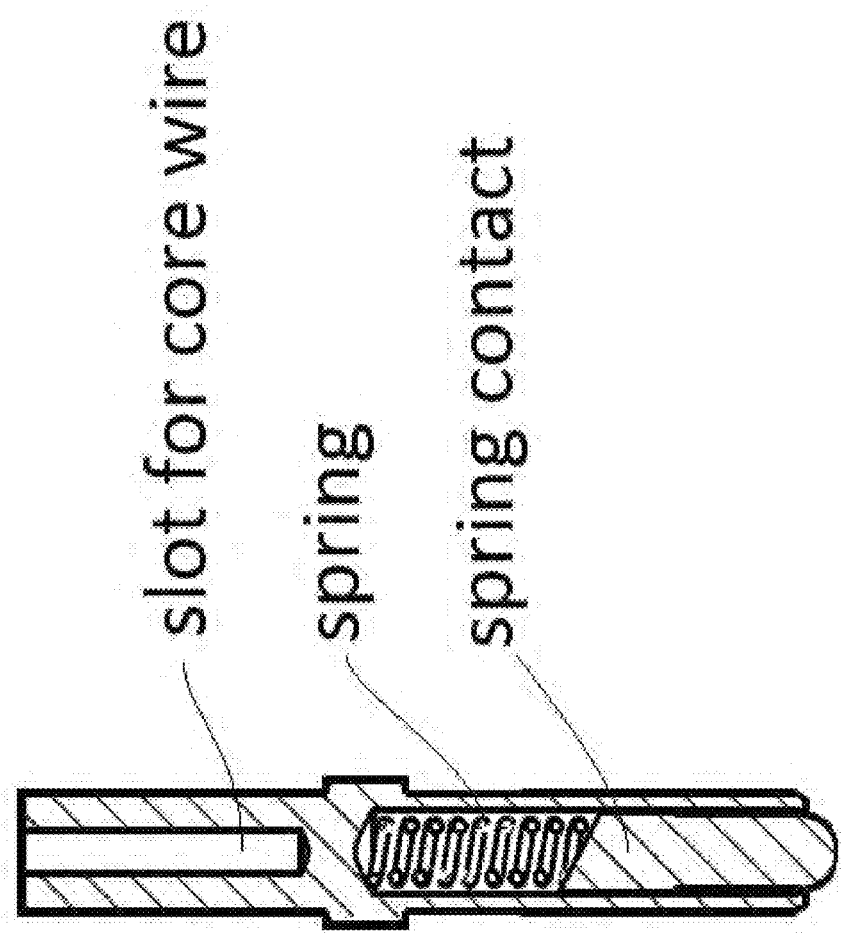
FIG. 11A shows a sectional view of a spring-loaded telescopic pin for being assembled at the coaxial cable core wire by putting the core wire into the core wire slot, before soldering, welding, or crimping.
Figure 11C:
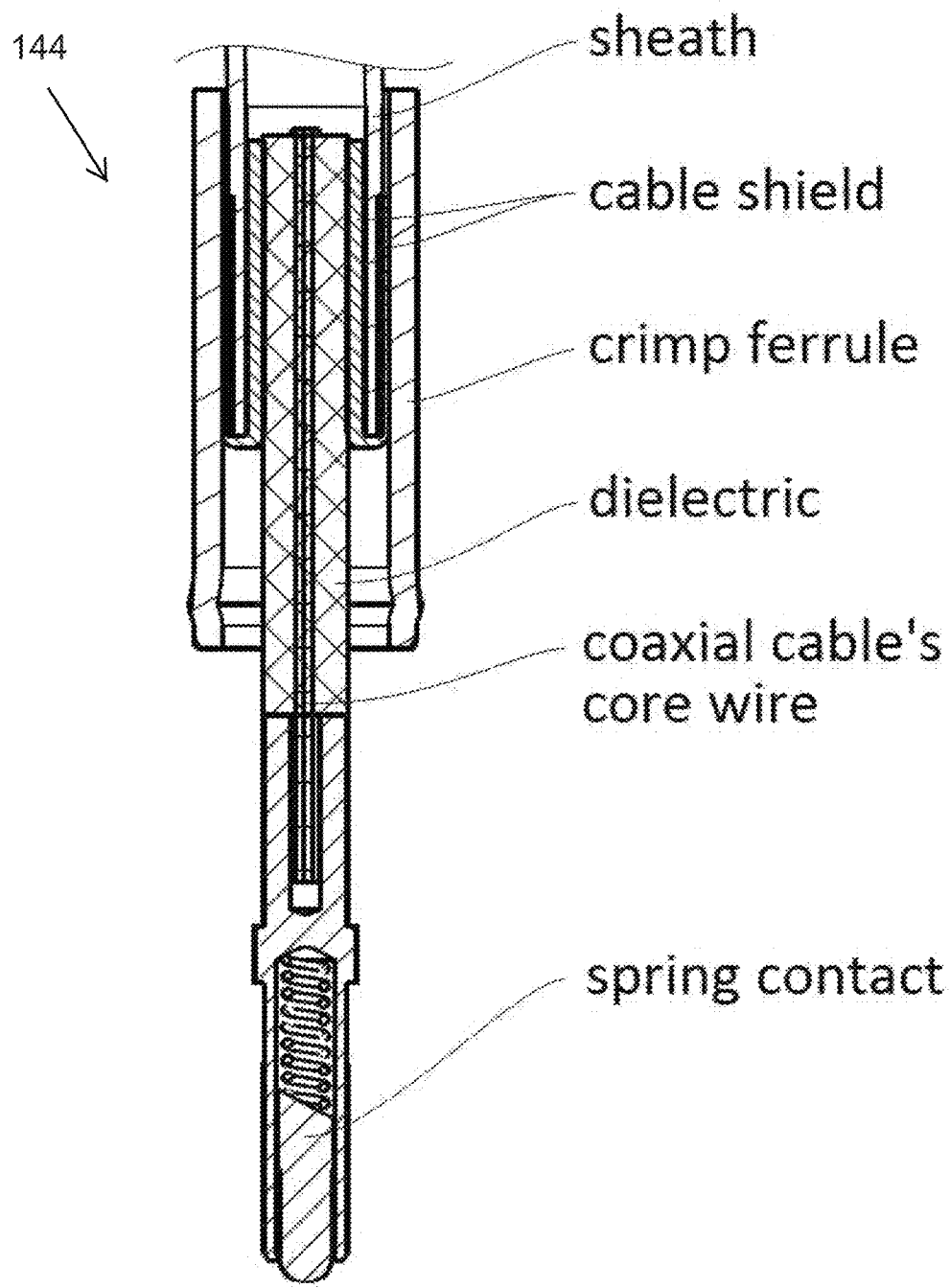
FIG. 11C is a sectional view of the assembly of FIG. 11B.
Figure 13A:
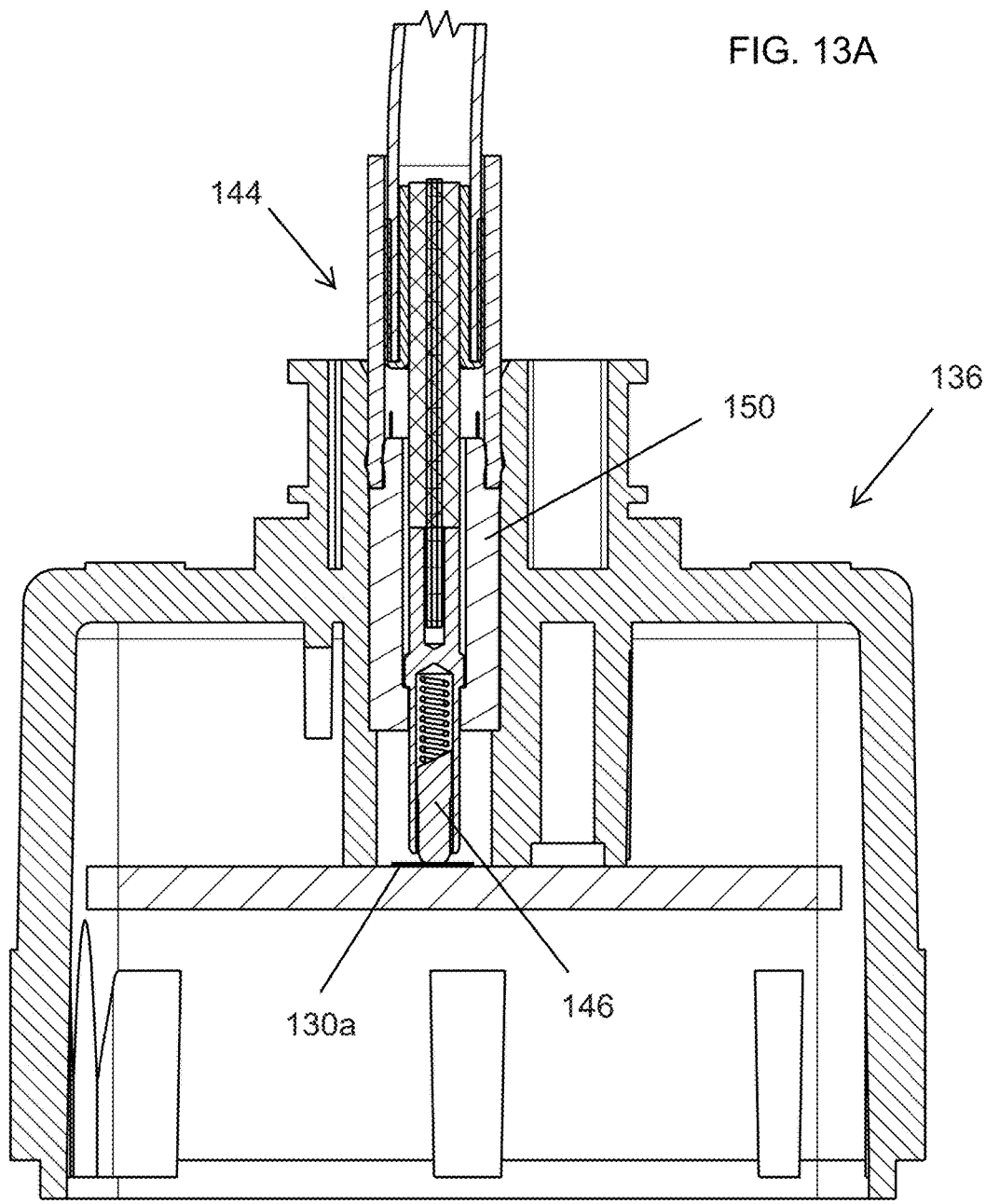
FIG. 13A is a sectional view of the full coaxial cable assembly according to the present invention which is already inserted (final application) to the camera housing.

The coaxial connector 144 of the present invention includes a flexible core pin 146 attached to a coaxial cable's core wire and provided to extend or reach through the rear camera housing 136 and the camera's housing contour to engage or electrically connect and conduct at an electrical contact connector pad or trace or receiver 130a at a camera's PCB 130 (see FIG. 13A). The electrical contact 130a may comprise a connector pad or electrically conductive trace established at the circuit board, or may comprise a socket or receiver or electrical component disposed at the circuit board. The flexible core pin of FIG. 11A is preassembled to the coaxial cable's core conductor such as shown in FIGS. 11B and 11C. The flexible pin is held and centered by a dielectric component 150 (see FIG. 12), which itself is attached to the coaxial cable by a crimp ferule 152 which additionally has the task to conduct the coaxial shielding (see FIGS. 13A and 13B). During assembly to the coaxial cable, the coaxial cable shield is folded back over the sheath (see FIG. 18) and the crimp ferule pushed over it (see FIG. 19). Optionally, the ferule fixation is additionally enforced by crimping (see FIG. 20). The center pin's root slot may be attached to the coaxial cable's core wire by crimping (FIG. 21), soldering or welding. Optionally, it may be attached by having an inner flange made for partially cutting a tread into the core wire for mechanical attaching and electrical conducting, without having the need of further treatments like soldering or crimping. Optionally, and such as shown in FIG. 16, the crimp ferule may extend all the way to the PCB to make electrical contact therewith, and a dielectric sheath may be provided between the core pin and the ferule to limit lateral movement or flexing of the core pin within the elongated ferule.

Thus, the coaxial connector of the present invention makes affirmative, robust and reliable electrical connection between a coaxial cable and circuitry of the circuit board when the spring biased connector end is urged against a circuit element (such as a pad, receiver or trace or the like) established or disposed at the rear surface of the substrate of the PCB.

The connector of the present invention may utilize aspects of the connectors described in U.S. Publication No. US-2015-0222795, which is hereby incorporated herein by reference. The coaxial connector solution attaches a coaxial cable to a vehicle camera's housing and PCB. The connector may use non air dielectric within the coaxial connector, see FIGS. 12, 13A, 13B and 16. PCB pins which have either flexible (bendable, spring like, such as shown in close up of FIGS. 13B and 15B) properties or fixed pins which insert into a socket with depths independent contacts may be used, such as described in U.S. Publication No. US-2015-0222795.

The direct assembly of the coaxial cable to the camera housing without having an outbound housing connector is done by having a slot in the housing wall which is metallized or coated with a conducting material for receiving the coaxial cable's shielding (or a shielding (crimp-) ferule) and with the coaxial cable's core contact having a preassembled laterally flexible PCB contact which gets inserted into a housing's channel toward the PCB sitting in the camera housing may be utilized, such as described in U.S. Publication No. US-2015-0222795. An optional crimp shell (such as shown in FIGS. 7-10, 11B and 12) may be provided for holding and conducting the coaxial cables shield 3 and the shielding meshwork 4 during or prior to camera assembly, such as by utilizing aspects of the connectors described in U.S. Publication No. US-2015-0222795. The centering contact carrier may optionally be part of the housing structure, such as can be seen with reference to FIGS. 14B and 14C. An optional contact carrier may hold the core contact in the center of the housing channel, such as by utilizing aspects of the connectors described in U.S. Publication No. US-2015-0222795. The selection of an optimal radius of the (round) shield inner surface and the core pin outer surface, so the distance of both is in accordance with the chosen dielectric, may be provided, such as by utilizing aspects of the connectors described in U.S. Publication No. US-2015-0222795.

Figure 14A:
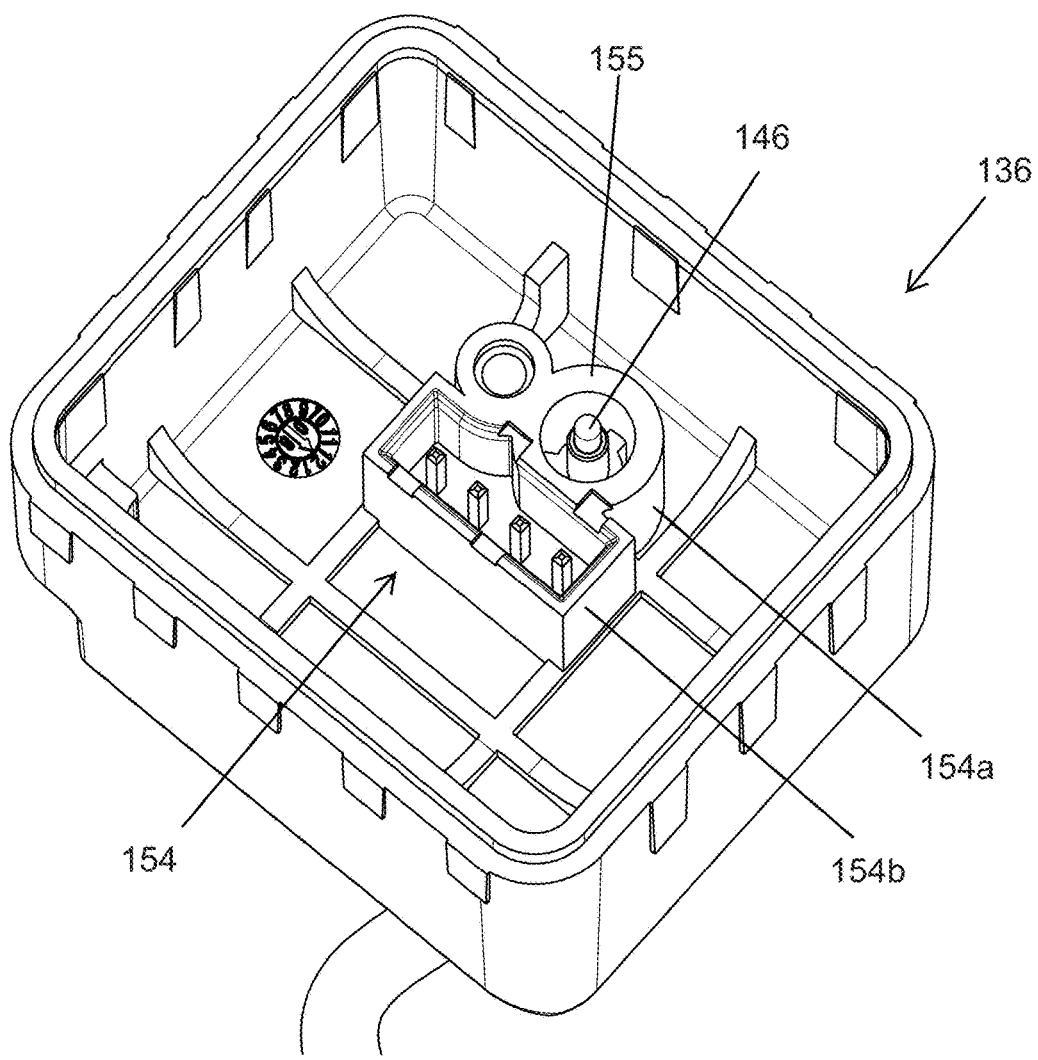
FIG. 14A is a rear perspective view of a camera housing structure having a coaxial connector interface of the present invention and additionally a four pin interface combined in one connector, showing the inside of the rear housing connector structure.
Figure 14B:
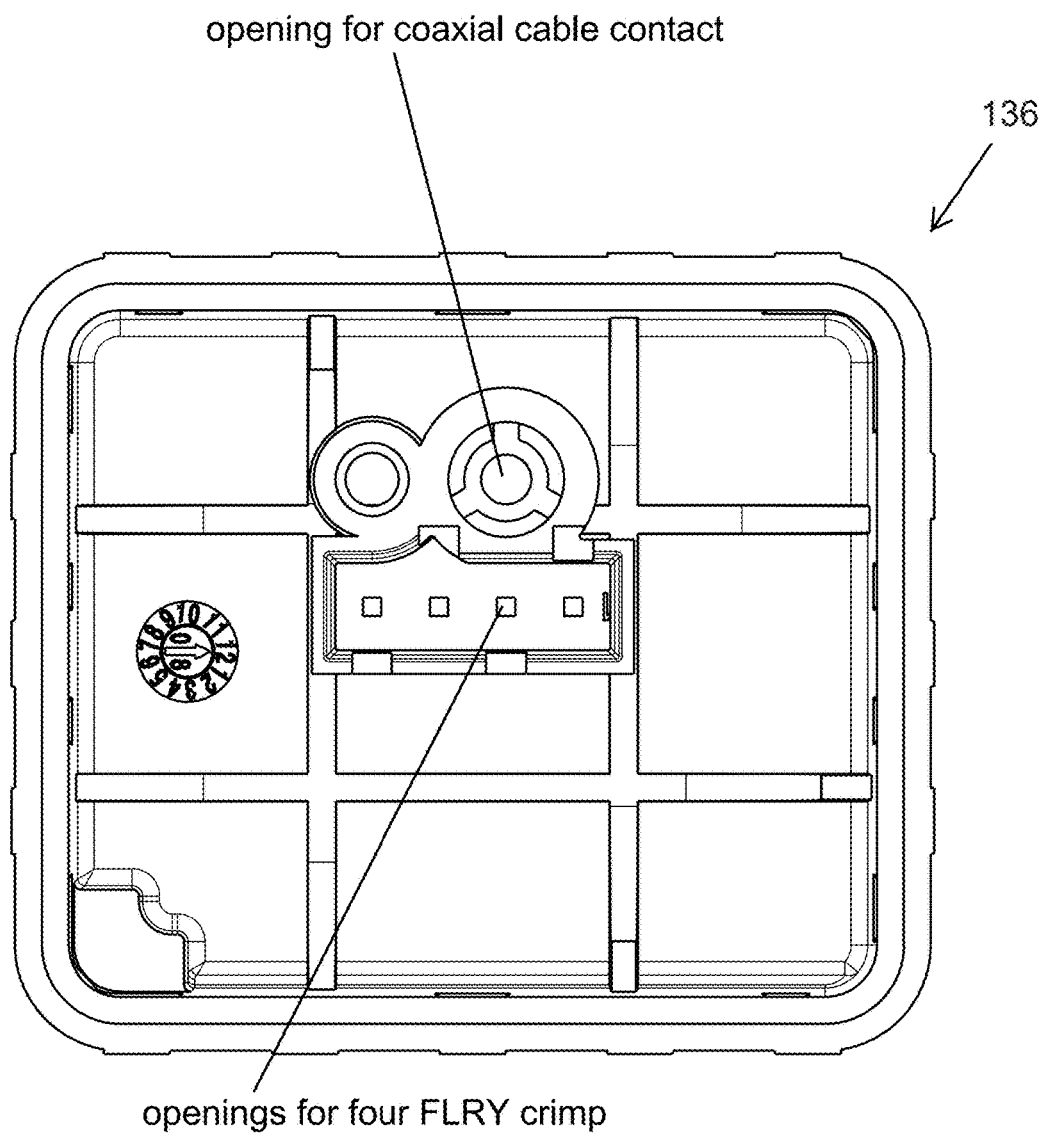
FIG. 14B is a view of the camera housing of FIG. 14A, showing a frontal view of the inside of the rear housing connector structure having a centering ring for the coaxial cable's core, a screw hole and holes for four pins.
Figure 14C:
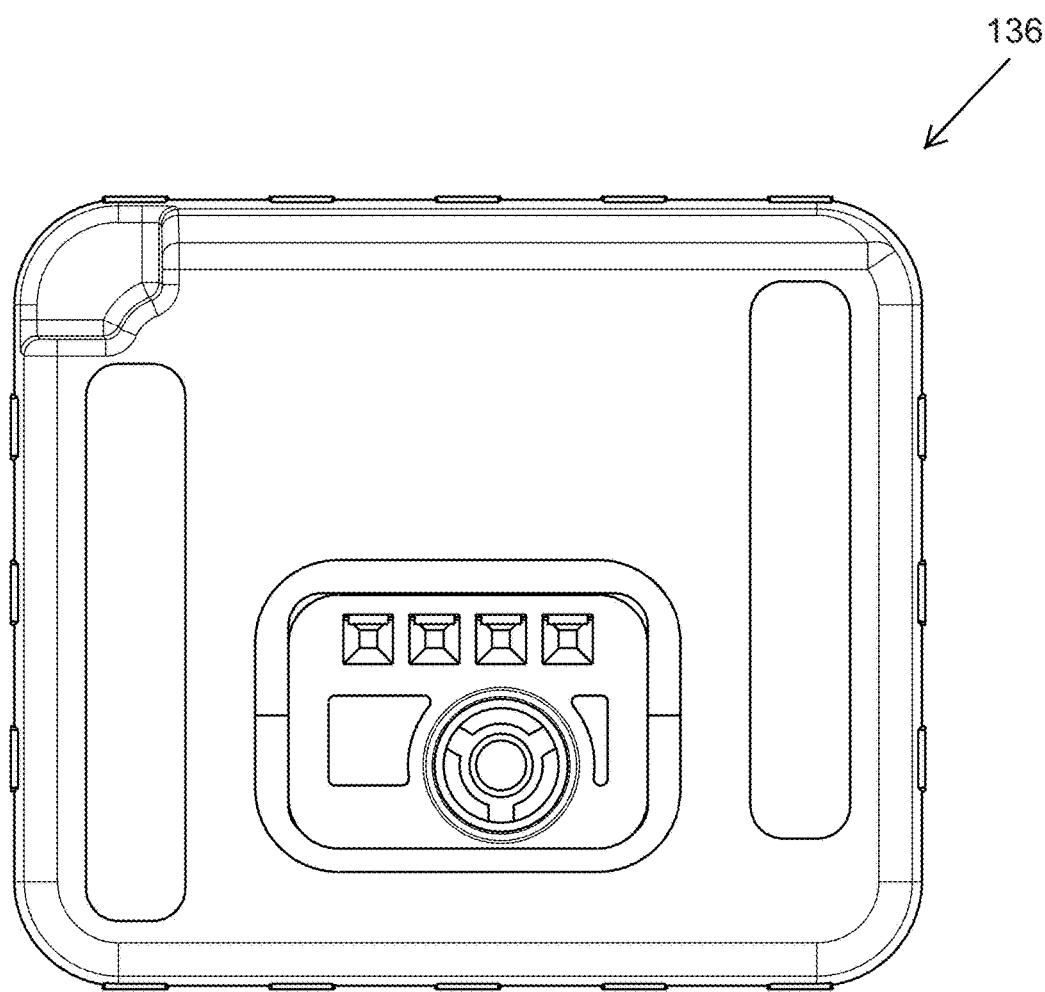
FIG. 14C is another view of the camera housing of FIG. 14A, showing a rear view onto the outside of the rear housing connector structure having a centering ring for the coaxial cable's core and holes for four pins.
Figure 14D:
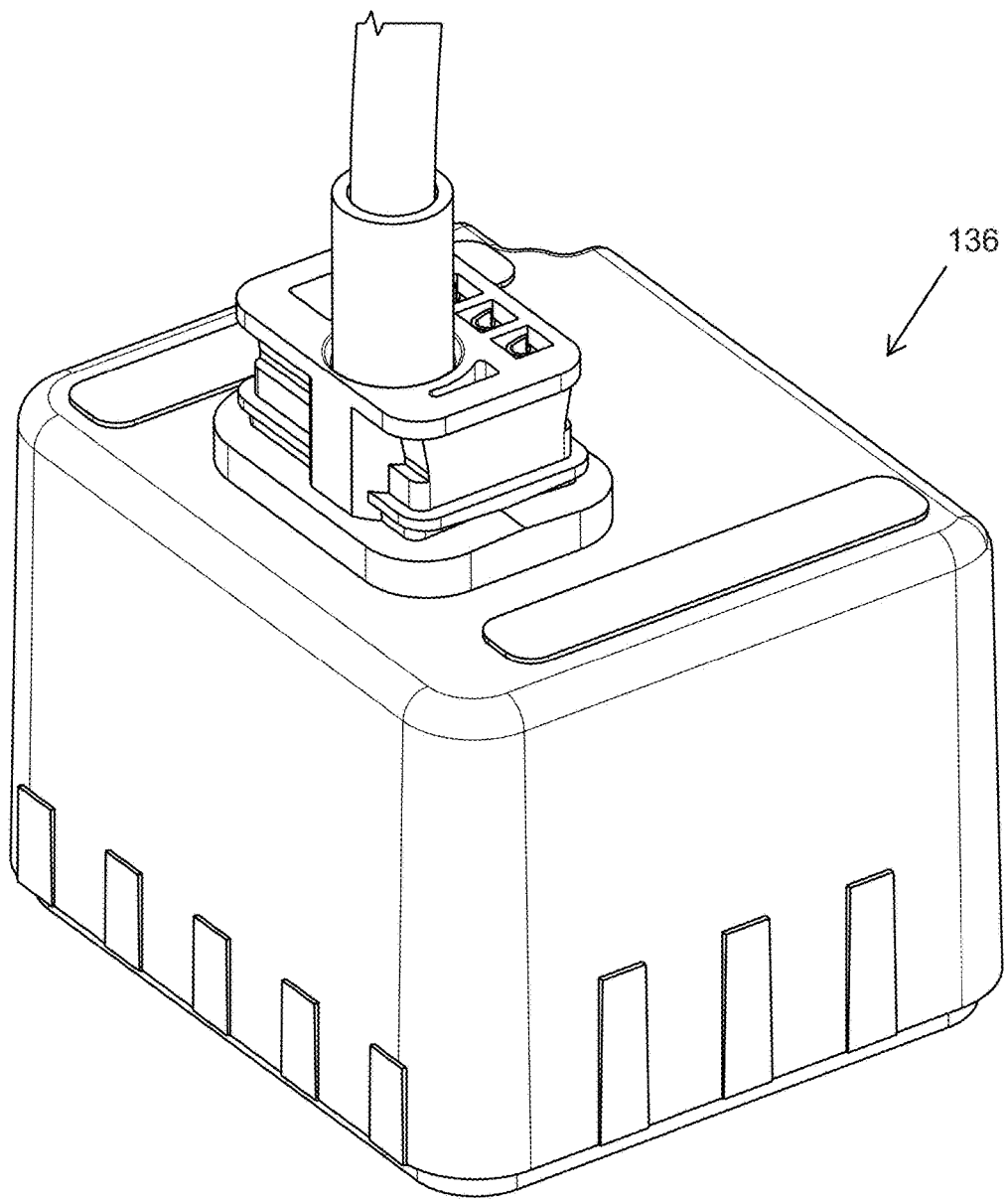
FIG. 14D is a perspective view of the rear housing of FIGS. 14A-C, shown with the coaxial cable applied.
Figure 14E:
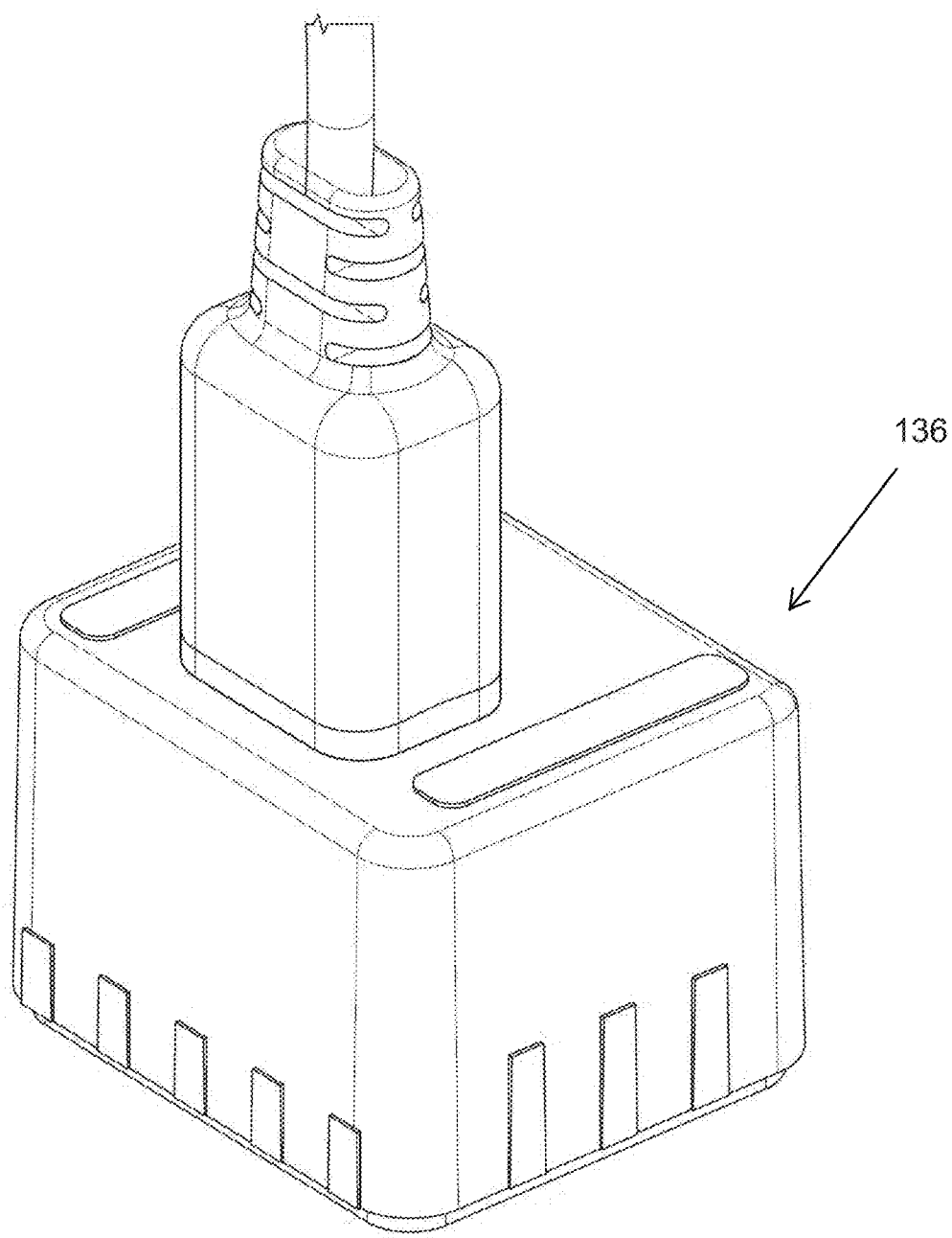
FIG. 14E is a perspective view of the rear housing of the connector and cable assembly of FIGS. 14A-D, shown with the camera rear housing and applied coaxial cable section overmolded.
Figure 15C:
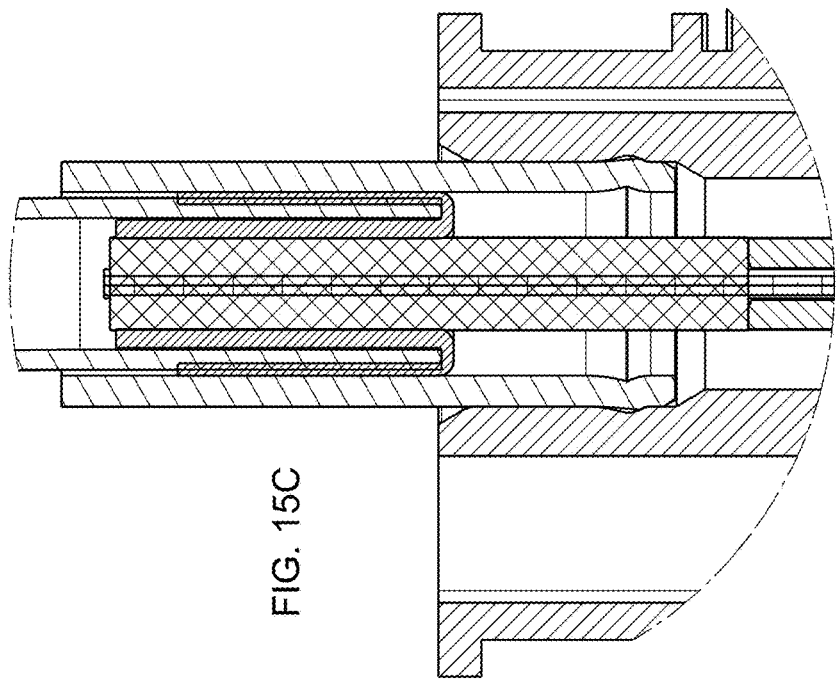
FIGS. 15B and 15C are enlarged sectional views showing additional details of the structure of FIG. 15A.
Figure 15B:
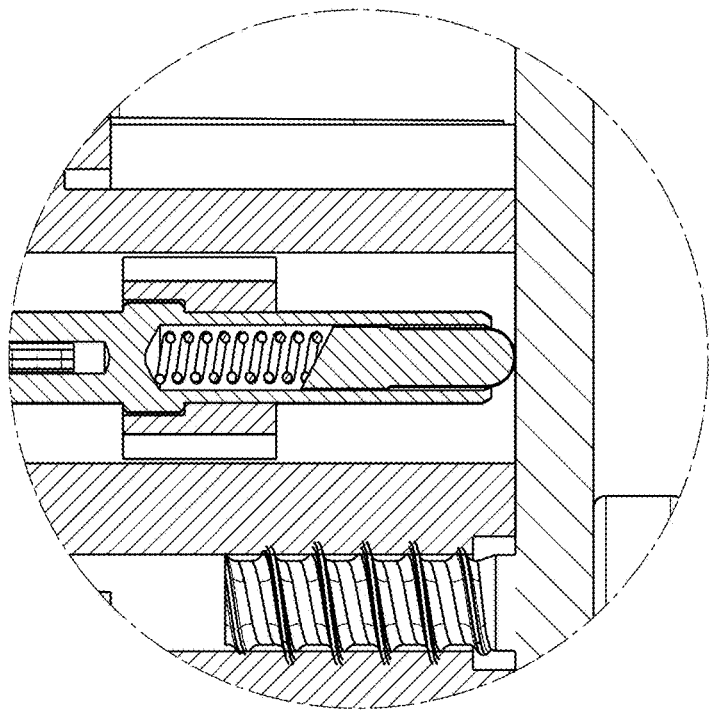
Figure 15D:
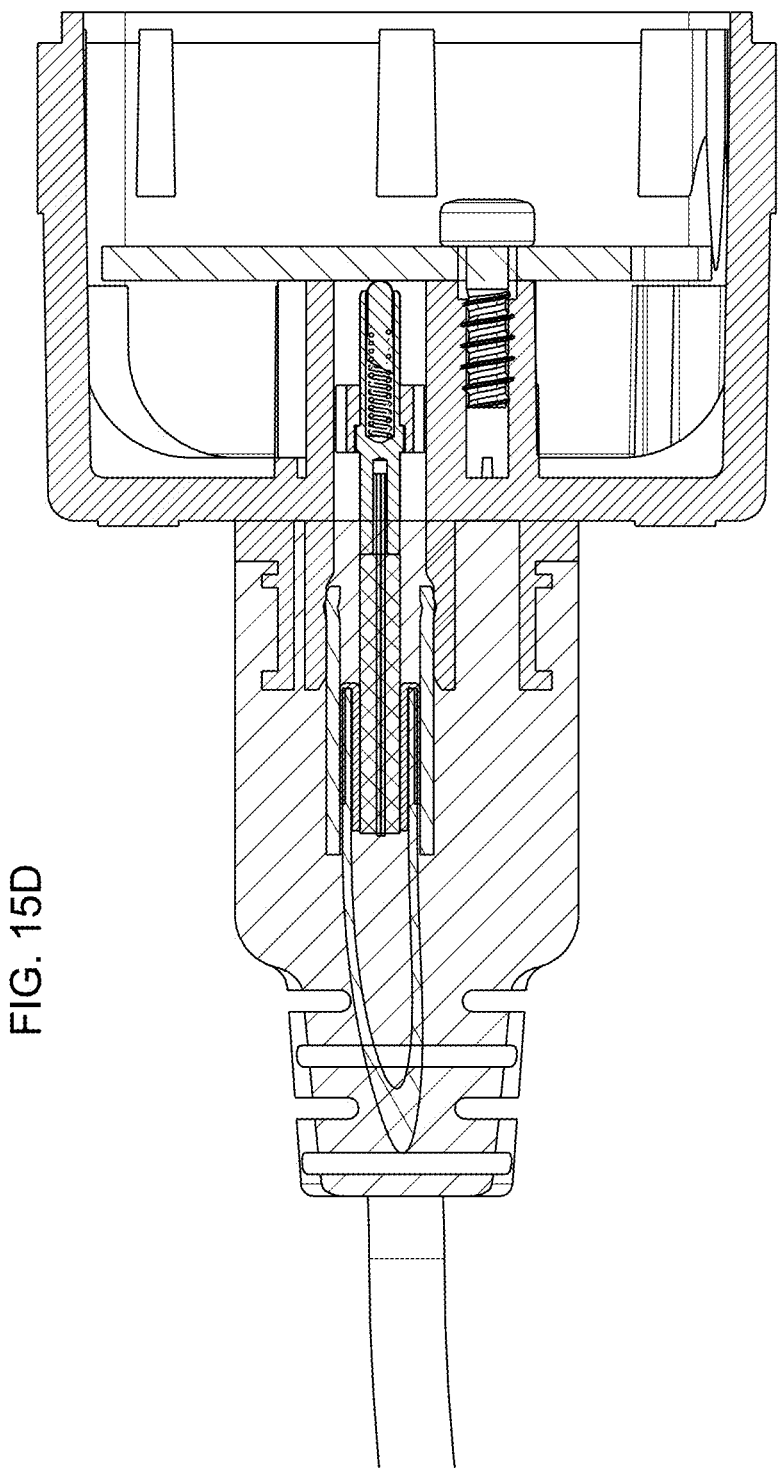
FIG. 15D is a sectional view of a camera's rear housing structure of FIG. 15A, shown with the camera rear housing and applied coaxial cable section overmolded, similar to FIG. 14E.
Figure 17:
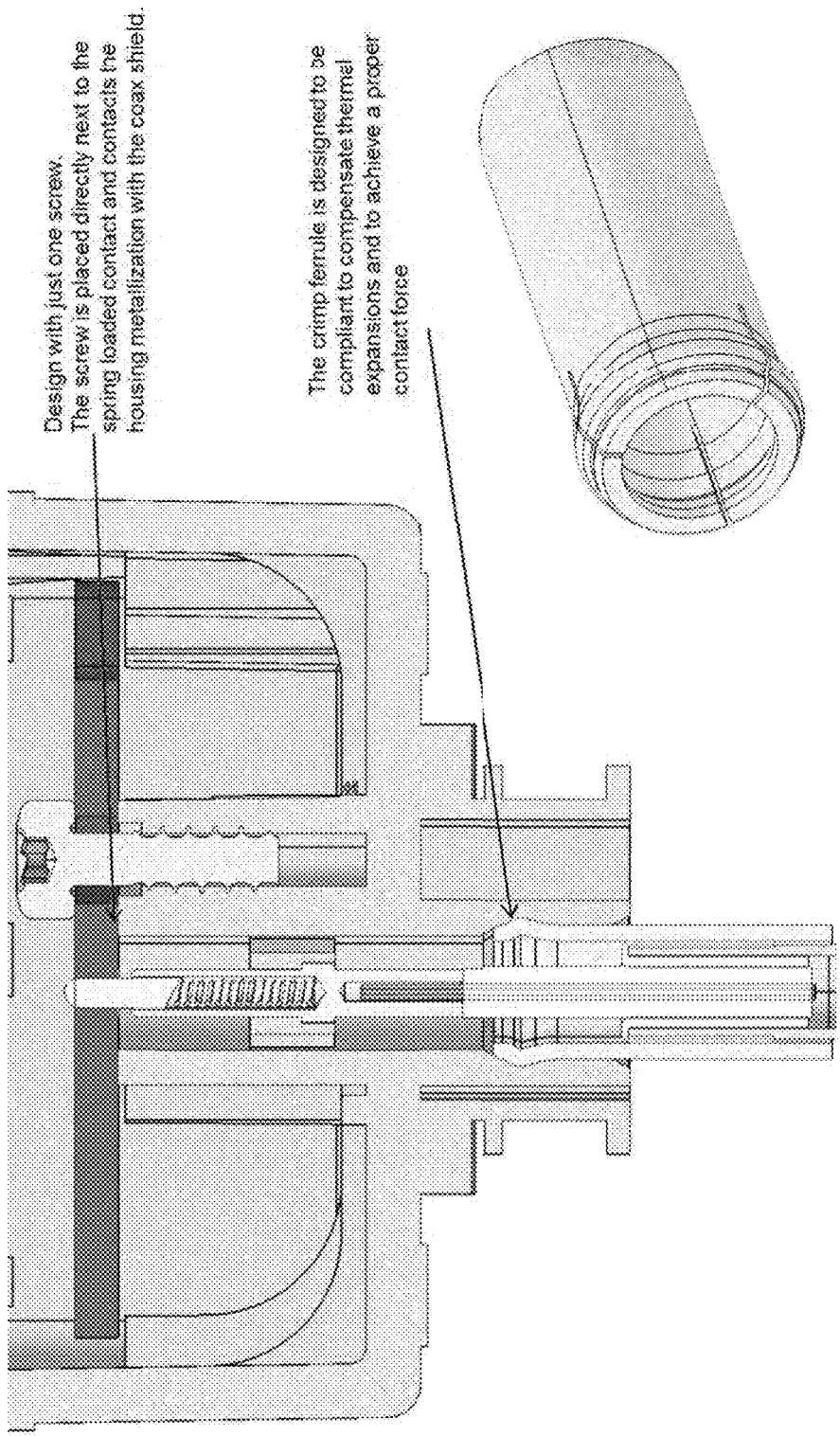
FIG. 17 is a sectional view similar to FIG. 16, additionally showing the fixation screw.
Figure 18:
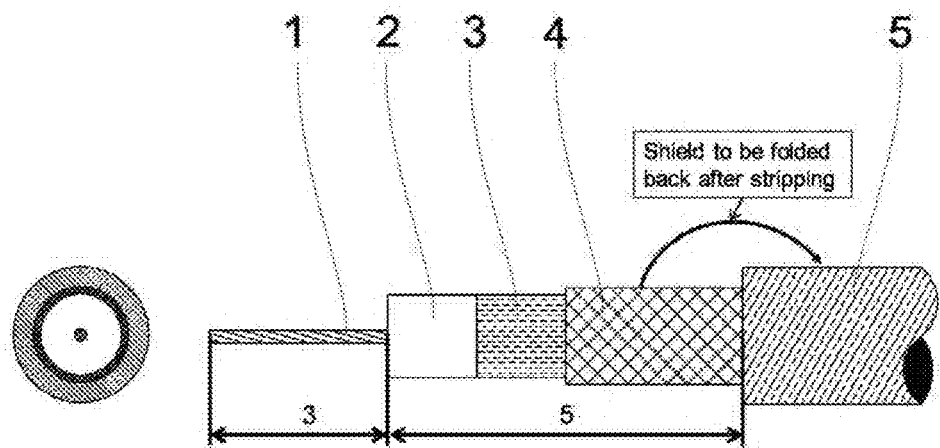
FIG. 18 is a side elevation of a cable showing the layers of a Leoni Dacar 462 coaxial cable (1 core, 2 dielectric, 3 shielding foil, 4 shielding meshwork, 5 sheath), with the shielding meshwork is to be folded back over the sheath before the crimp ferrule gets assembled over it.
Figure 19:
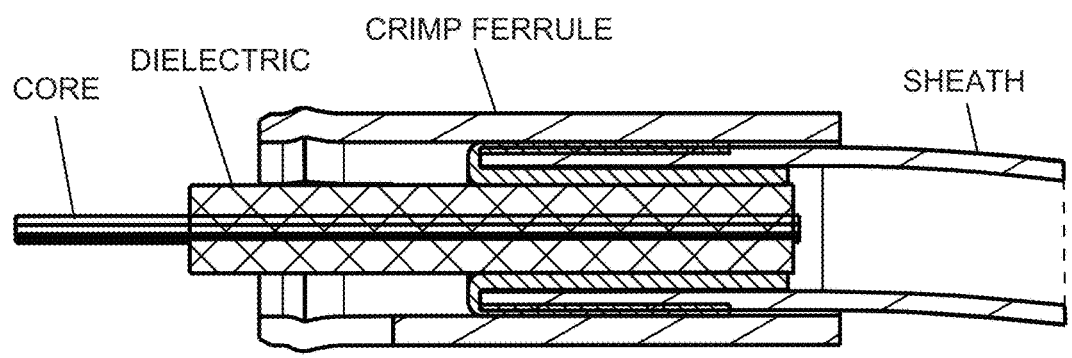
FIG. 19 shows the Leoni Dacar 462 coaxial cable with a crimp ferrule (or sleeve) assembled over the folded back shielding meshwork.
Figure 20:
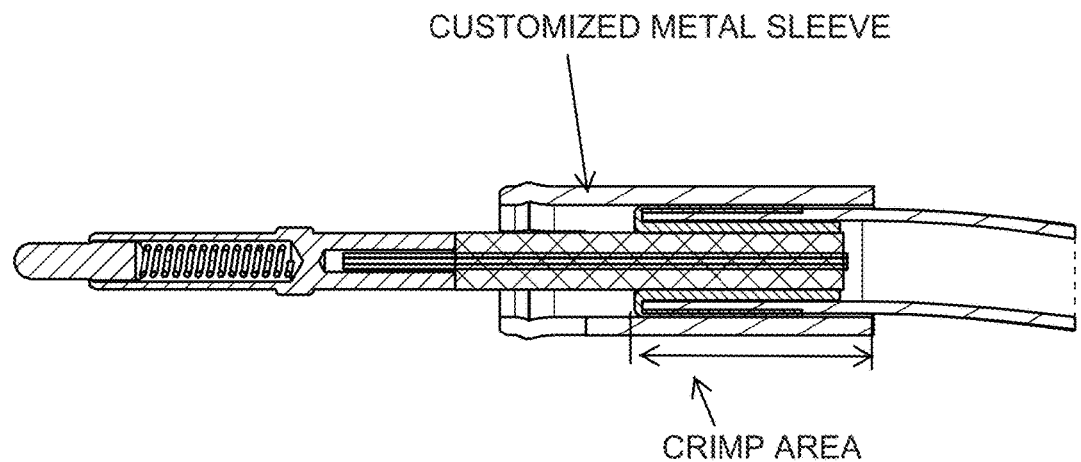
FIG. 20 is a partial sectional view of the crimp area when the crimp ferrule gets crimped.
Figure 21:
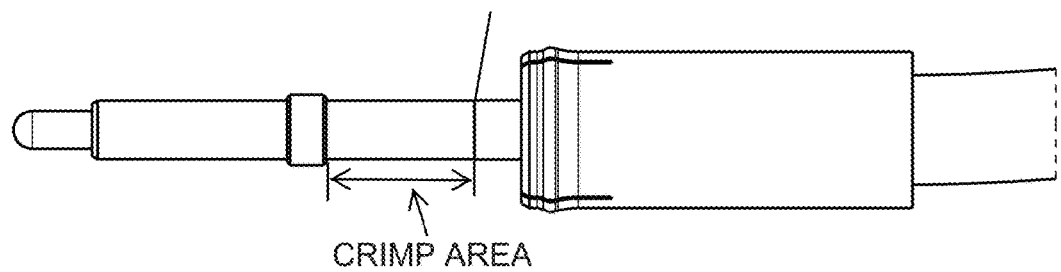
FIG. 21 shows the crimp area when the core pin gets crimped to the coaxial cable's core.
Figure 22:
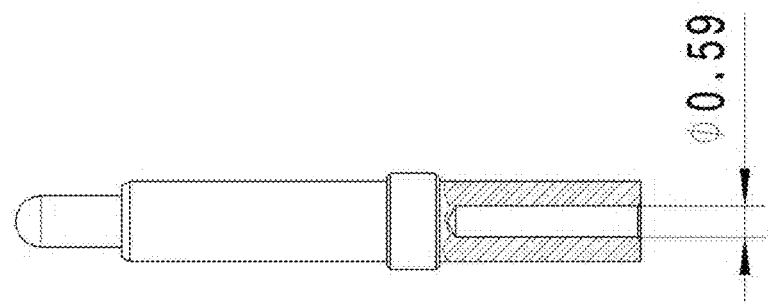
FIG. 22 shows a partial sectional view of the crimp area of the flexible pin as finding use for being assembled to the coaxial cable's core in accordance with the present invention.
Figure 23:
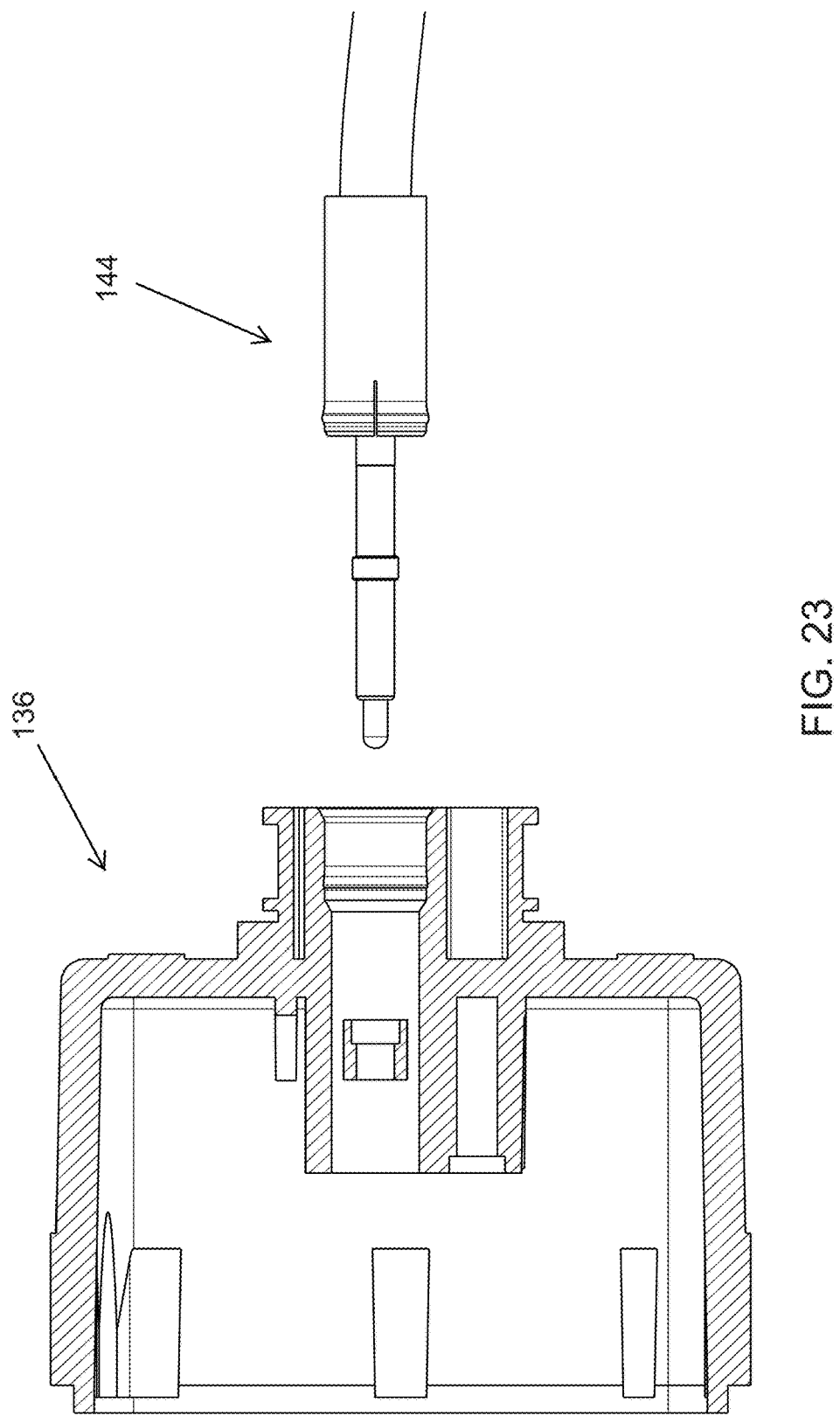
FIG. 23 is a side elevation and partial sectional view showing the insertion direction of the preassembled cable into the housing channel, with the housing shown as a sectional view.
Figure 24:
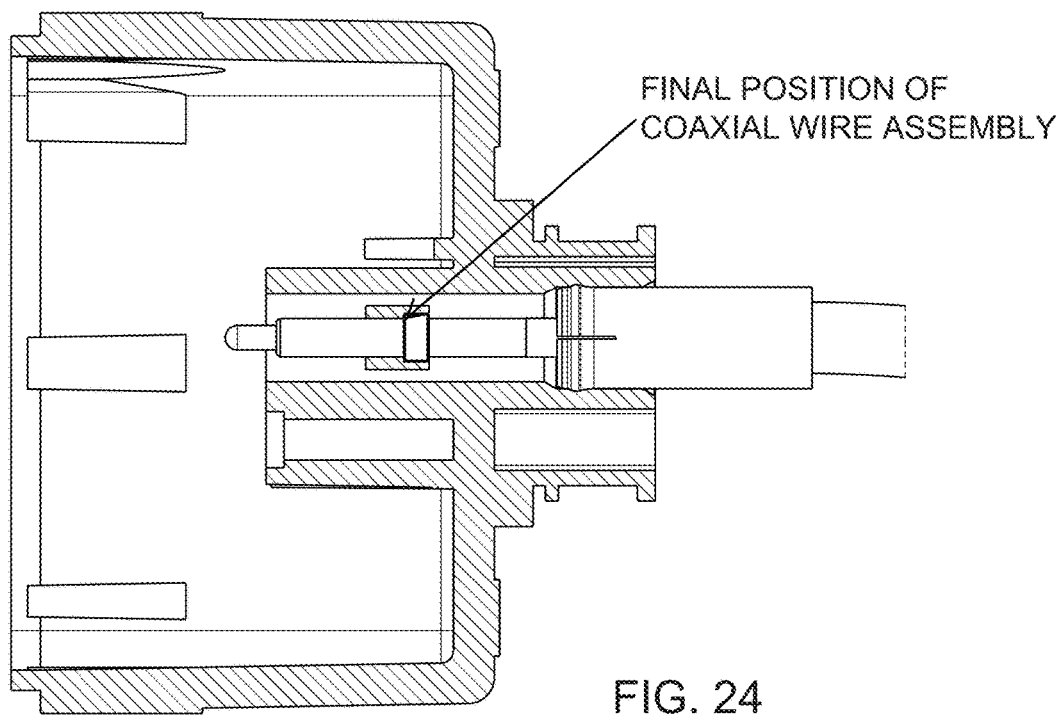
FIG. 24 is a side elevation and partial sectional view of the fully inserted coaxial cable with flexible pin inside the housing's channel.
Figure 25:
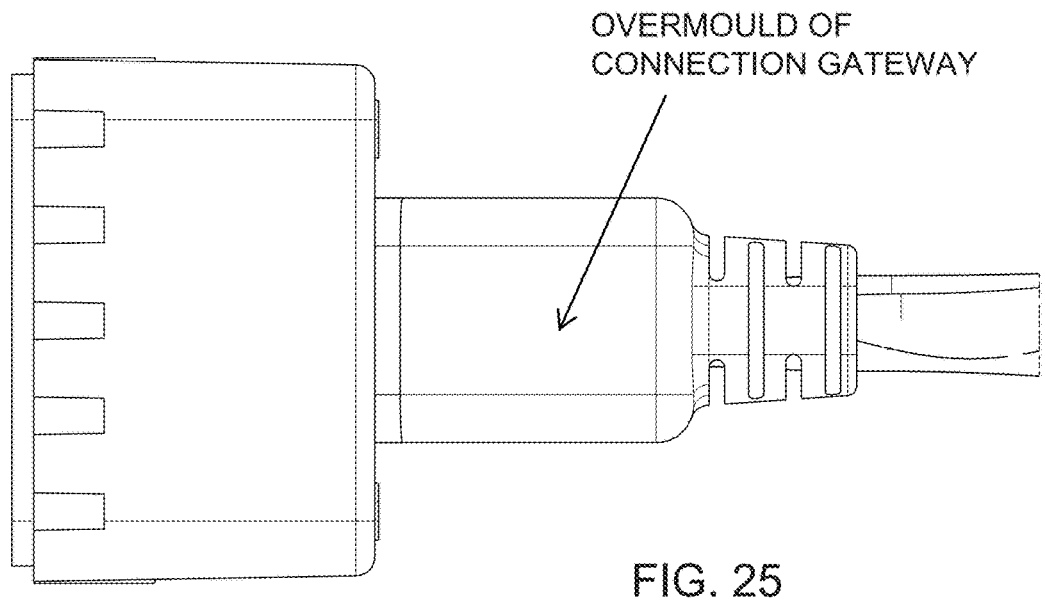
FIG. 25 is a side elevation of the camera rear housing with the coaxial cable assembly of the present invention with overmold.

Optionally, the coaxial cable structure with flexible pin and shielding—crimp ferule of the present invention may be paired with different connector types, such as connectors having a single pin, such as shown in FIGS. 3-6A, or multiple pins having a common circumferential shielding or one shielding each. Examples of such a pairing is shown in FIGS. 14A-D and 25. For example, and such as shown in FIG. 14A, the rear camera housing 136 may include a connector portion 154 that has a cylindrical portion 154a through which the flexible end or pin 146 of the coaxial connector may extend, and the connector portion 154 also includes a multi-pin connector portion 154b that receives the pins or terminals of a multi-pin connector (such as described above), which may then electrically connect to terminals and circuitry at the circuit board. The flexible pin of the coaxial cable connector and the terminals of the multi-pin connector may connect to circuitry elements at the PCB during assembly of the camera, such as discussed above. The shield of the single pins may optionally be done by metallization of the camera rear housing inner wall next to the to-be-shielded pin. Depending on the application, the outbounding cables may be overmolded as can be seen in FIGS. 14E and 25, such as for tightening and pull relief purposes. FIGS. 23 and 24 show the insertion steps when assembling the preassembled coaxial cable structure with flexible pin and shielding—crimp ferule to the camera housing. The ferule's contour is made for plugging into the camera housing's coaxial cable slot inner wall contour (such as within the cylindrical receiving portion 154a), with the flexible pin extending from the ferule and from the cylindrical connector portion to engage circuitry (such as an electrically conductive pad or trace or element) at the circuit board when the camera is assembled. Optionally, the inner wall of the cylindrical receiving portion 154a may optionally be metallized or otherwise electrically conductive to electrically connect with the metallic ferule when the ferule is pressed into the receiving portion, and the metalized inner wall may electrically conductively connect with circuitry at the circuit board when the circuit board is disposed at the rear housing portion (such as can be seen with reference to FIGS. 13A and 13B). In such a configuration, the annular surface 155 (FIG. 14A) of the cylindrical receiving portion 154a is also metalized so that electrical connection between the ferule and circuitry at the circuit board is made via engagement of the annular surface 155 to one or more electrically conductive traces or pads or the like at the circuit board when the camera is assembled.

Thus, the connector or connectors of the rear housing portion may be molded with the housing portion and includes a multi-pin connector portion and a coaxial connector portion. The multi-pin connector portion receives multi-pin connector terminals therein, and the terminals (which may be pins or receiving elements for receiving pins) engage corresponding terminals (such as receiving elements or pins or circuitry elements) at the circuit board when the circuit board is moved into engagement with the terminals. The circuit board may include a header shield and the connector portion may include a spring shield or clamp that, when the connector is connected to the header shield of the PCB, bear against the header shield to create a continuous ground path to the PCB, to shield the center pin in all relative positions of the PCB and housing, and to protect against external EMI, such as discussed above. The connectors (including the multi-pin connector portion and the coaxial connector portion) may be formed adjacent to one another or as part of a single connector, or may be formed separate from one another as separate and distinct connectors of the camera housing.

The coaxial connector portion receives a coaxial connector therein, with an extended core pin of the coaxial connector extending to contact a circuit element at the circuit board, and with the crimped ferule of the coaxial connector being press fit or interference fit within the coaxial connector portion. The inner surface of the coaxial connector portion may be metalized or otherwise electrically conductive, with that metalized surface being in electrical connection with a circuit element at the circuit board when the camera is assembled together. Optionally, and desirably, due to the extended length of the core pin from the ferule, a dielectric element may be disposed along the core pin and within the coaxial connector portion to limit lateral flexing of the core pin and shorting of the core pin at the electrically conductive or metalized inner surface during assembly of the camera and during use over the lifetime of the camera at a vehicle. The core pin may comprise a spring-loaded core pin to enhance electrical contact and connection at the circuit element of the circuit board when the camera is assembled.

Figure 26A:
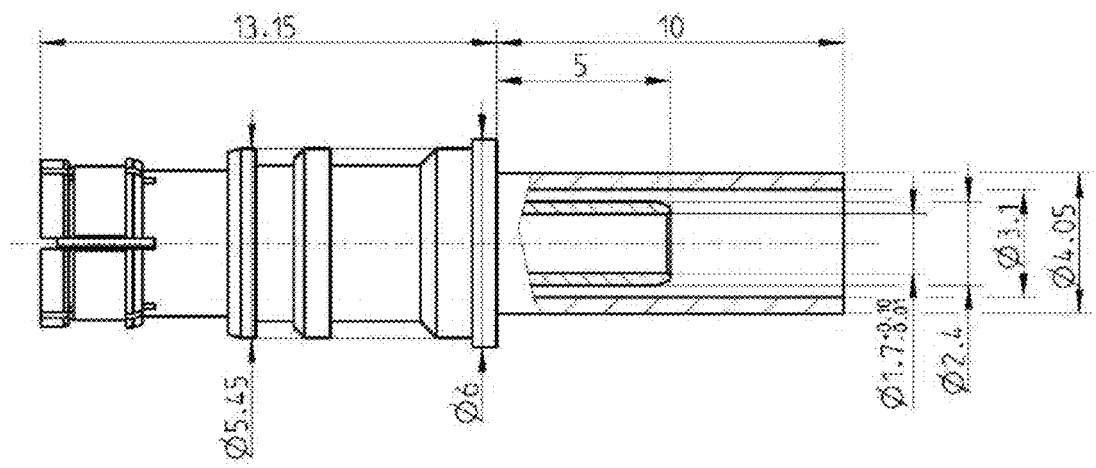
FIG. 26A is a side elevation and partial sectional view of a coaxial cable connector suitable for use with the connection system of the present invention, with FIG. 26A showing a FAKRA Rosenberger 59K13O-102A4 coaxial cable connector.
Figure 26B:
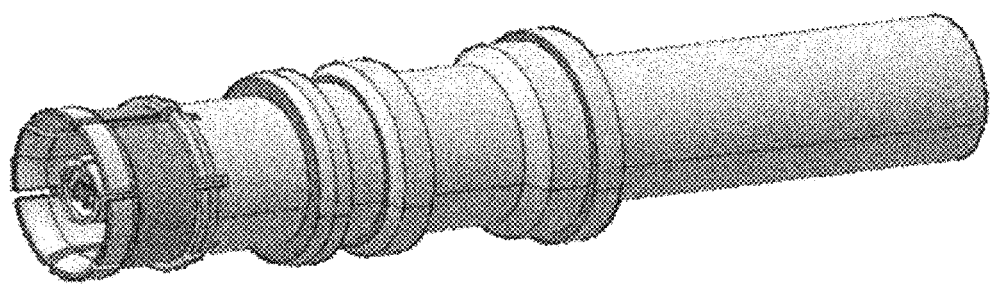
FIG. 26B is a perspective view of the connector of FIG. 26A.
Figure 26C:
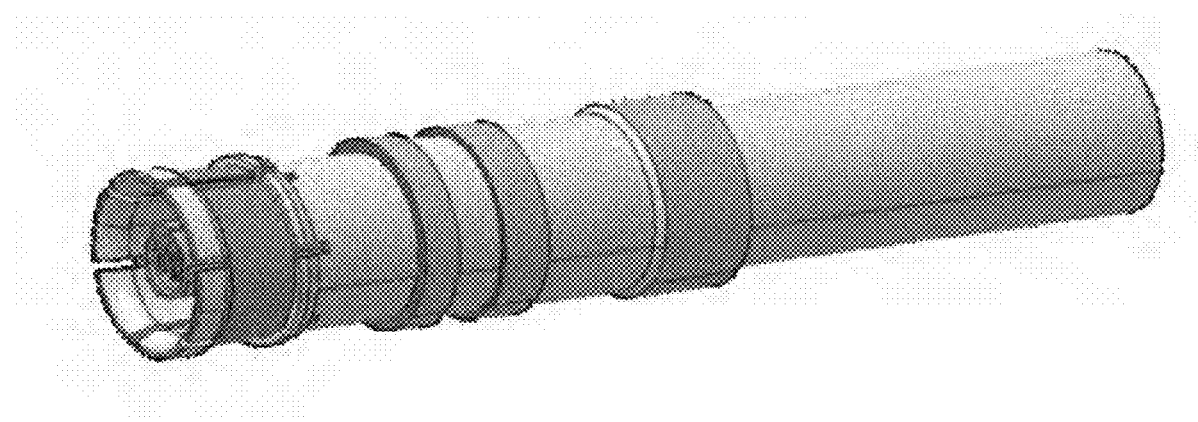
FIG. 26C is a coaxial cable connector similar to that of FIGS. 26A and B, shown with modified flanges for enabling the use for press fit mounting.
Figure 26D:
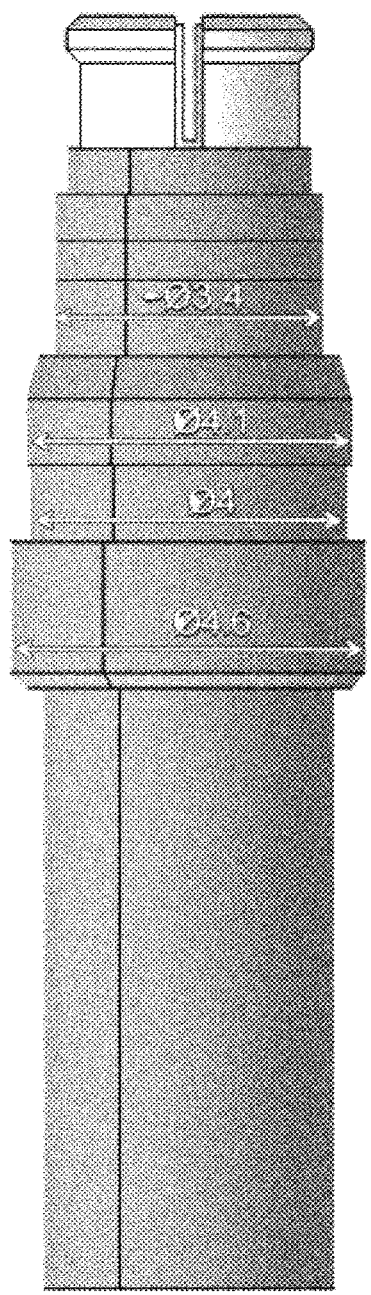
FIG. 26D is a coaxial cable connector similar to that of FIGS. 26A-C, shown with having an SMP Rosenberger connector interface with modified flanges for enabling the use for press fit mounting.
Figure 27:
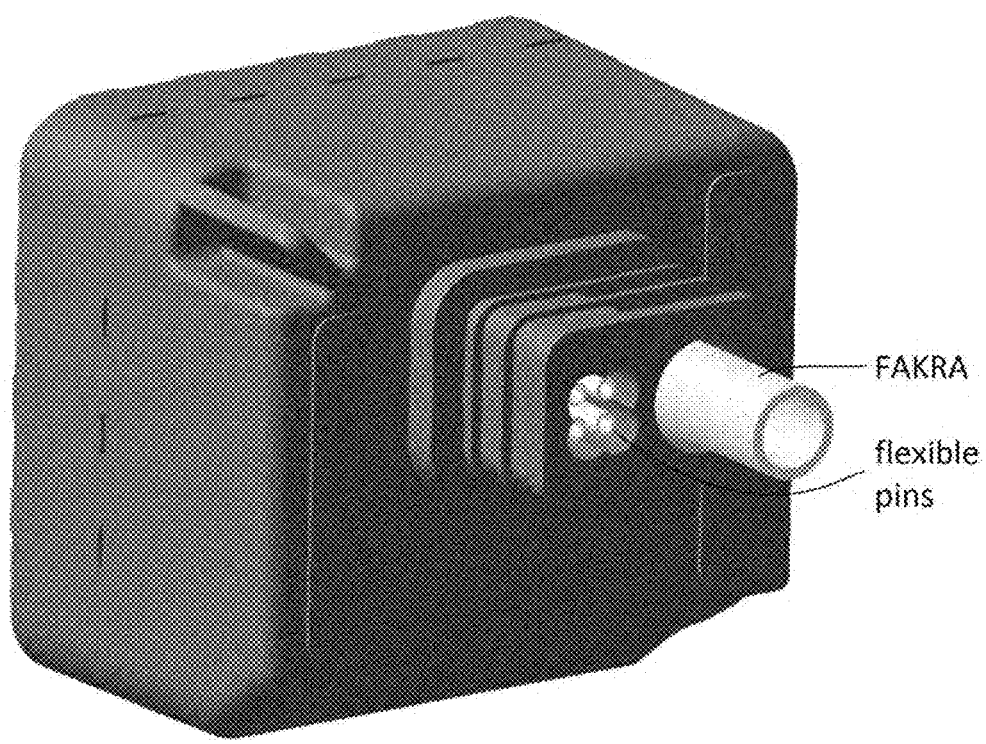
FIG. 27 is a perspective rear view of a camera rear housing with a press fit modified connector connected thereto.
Figure 28:
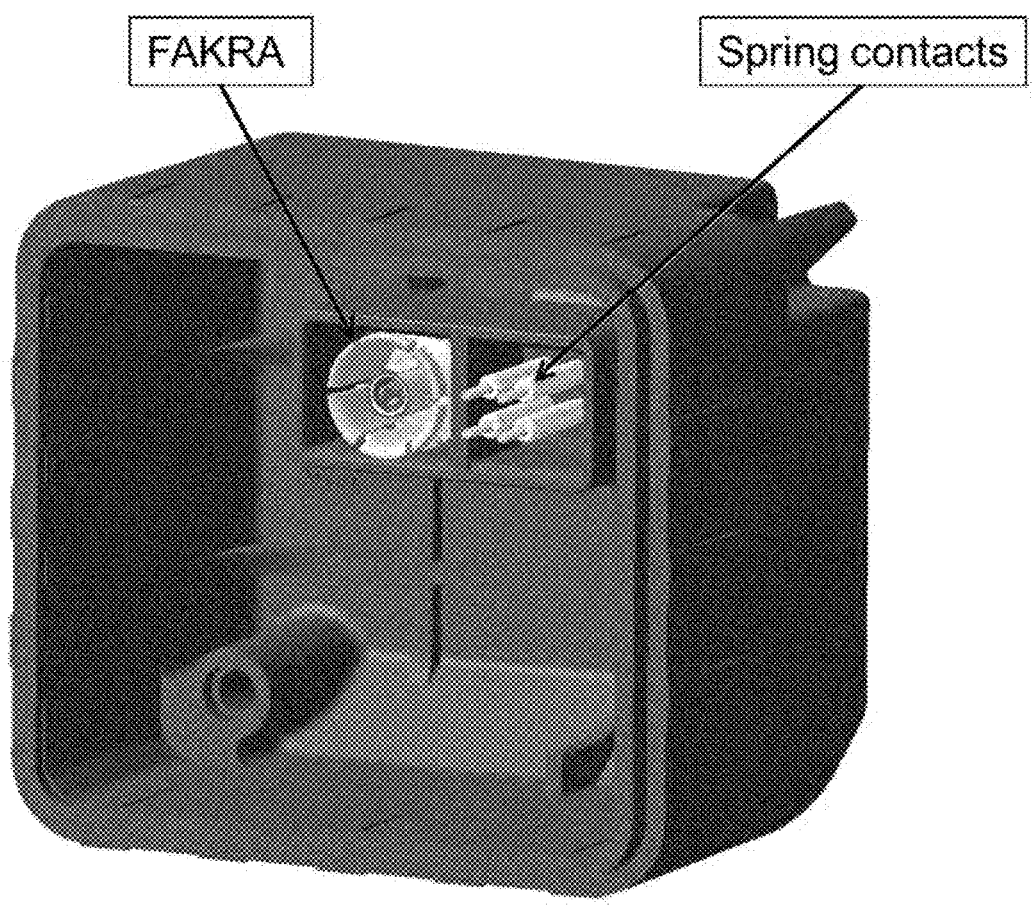
FIG. 28 is a perspective front view of a camera rear housing with a press fit modified connector connected with the flexible elements of the coaxial connector's shield skirt and core shell visible, shown with four flexible non-coaxial press fit pins having a laterally flexible portion (by a spring)
Figure 29:
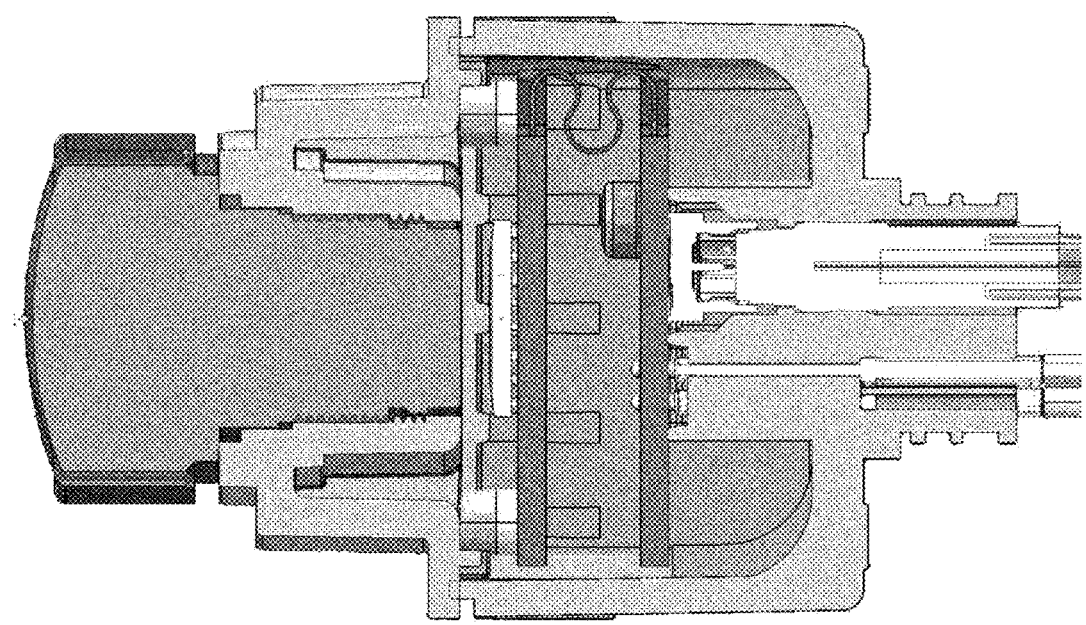
FIG. 29 is a sectional view of a readily assembled camera (but without the overmold), with the coaxial cable plug reaching out of the camera's rear housing into the PCB coaxial SMD header of FIG. 30, the coaxial cable connector of FIG. 26C and some of the four non coaxial spring contacts of FIG. 28 visible.

Optionally, and with reference to FIGS. 26-29, a coaxial cable plug structure (such as a FAKRA Rosenberger 59K13O-102A4 or SMP (such as a Rosenberger 99K15K-102A5) such as shown in FIGS. 26A and 26B) may have a modified flange (see FIGS. 26C and 26D) for enabling mold material press fit, preassembled to an outbound coaxial cable that may reach through the housing, and may be inserted by press fit, having a laterally flexible shielding skirt which is divided into circular segments to adapt to a mating solid PCB carrier structure having a solid shielding ring, such as by utilizing aspects of the connectors described in U.S. Publication No. US-2015-0222795. The press fit plug structure also has a laterally flexible shell in its center to mate with a solid core pin reaching out of the PCB header structure.

Figure 30:
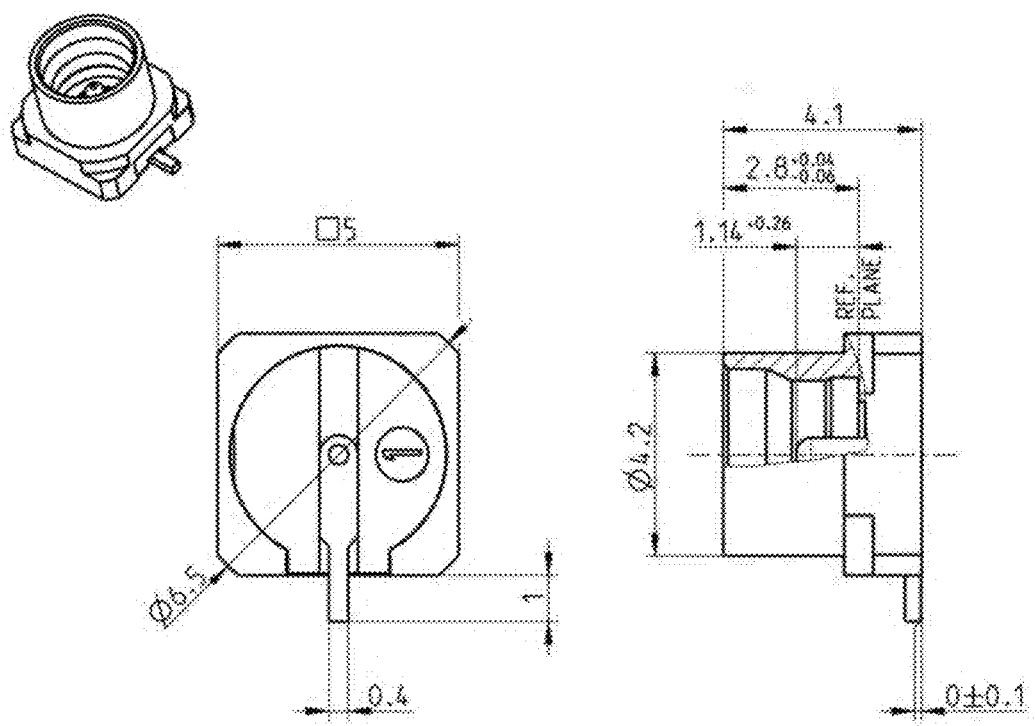
FIG. 30 is a known Rosenberger SMD coaxial SMD header, No. 17S101-40ML5.
Figure 31:
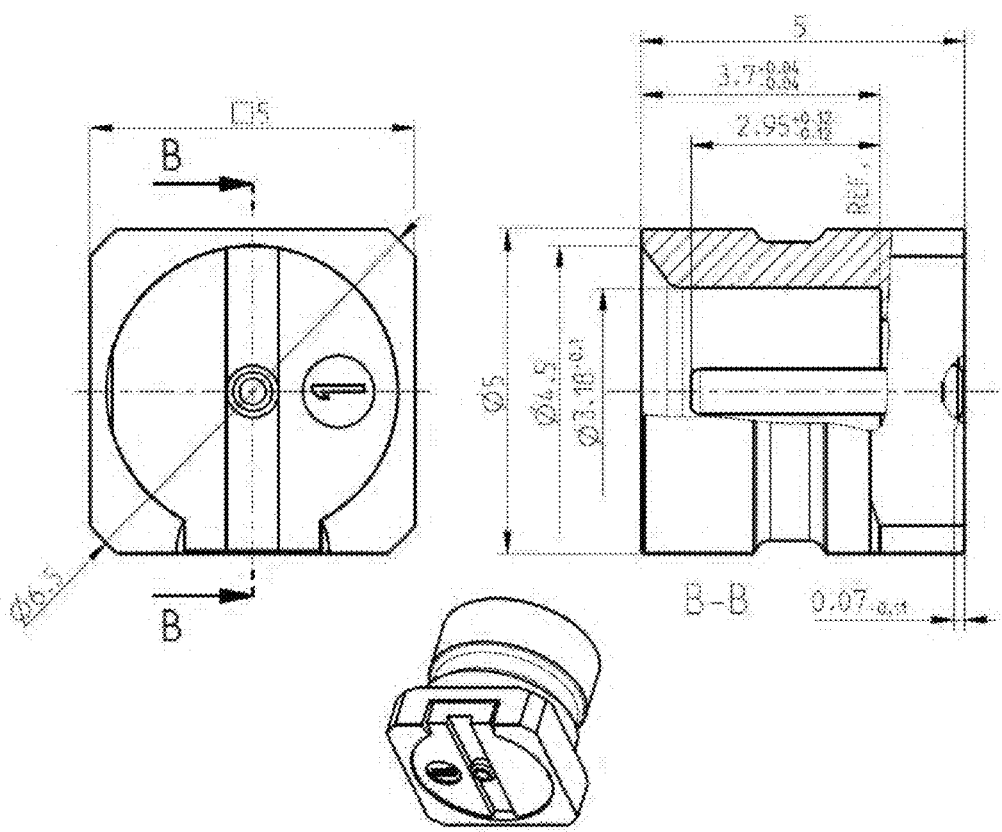
FIG. 31 is a modified PCB coaxial SMD header similar to the header of FIG. 30, but with the shield contact's shoulder pulled up for smoothing the resting depths of the counter connector.
Figure 32:
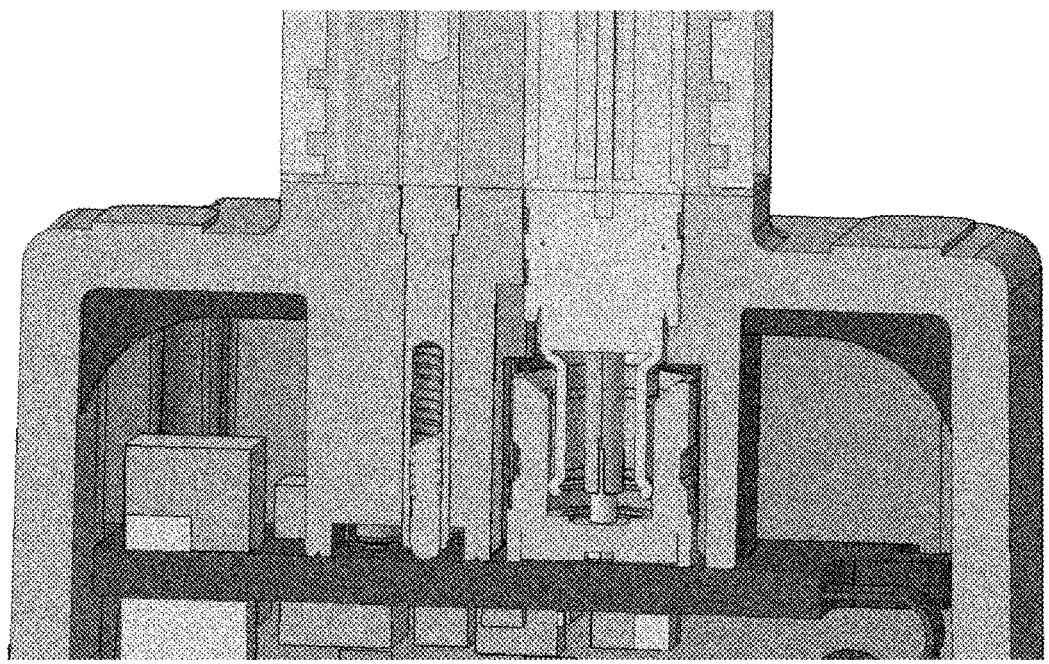
FIG. 32 is a sectional view of a readily assembled camera with the overmold for tightening and pull relief, with the coaxial cable plug reaching out of the camera's rear housing into the (modified) PCB coaxial SMD header of FIG. 31 in use.
Figure 33A:
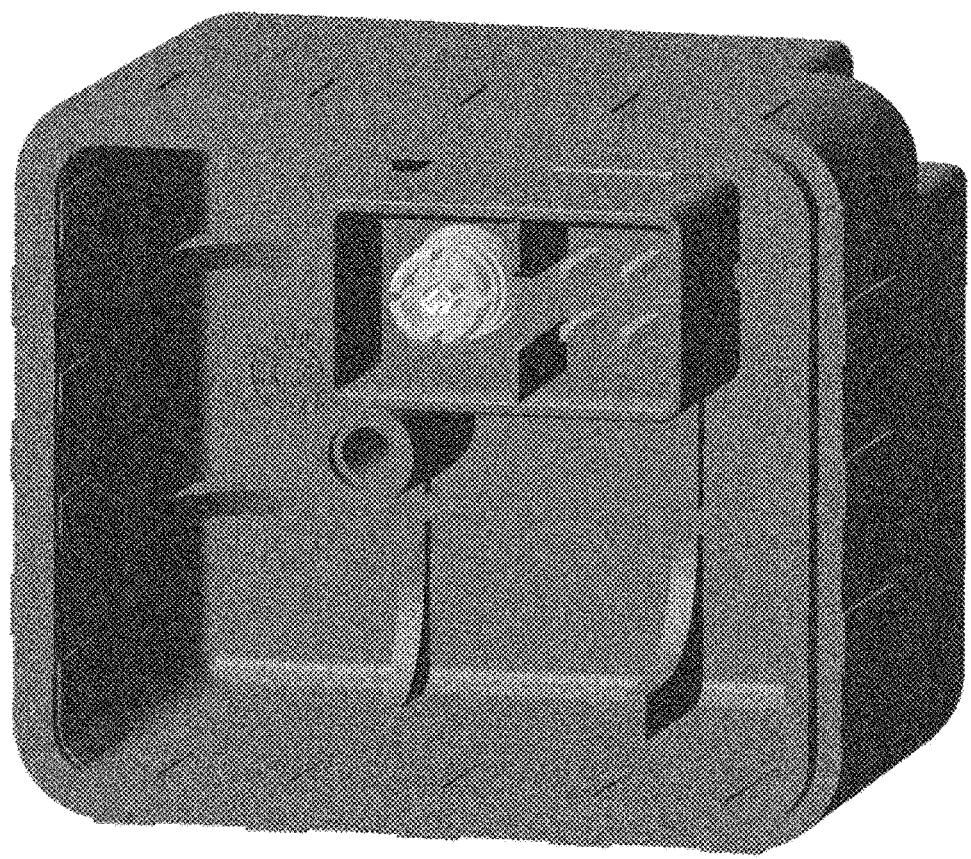
FIG. 33A is a perspective view of a camera rear housing similar to FIG. 28, with the coaxial connector part shown from inside the camera rear housing after attaching by press fit (in this case from outside)
Figure 33B:
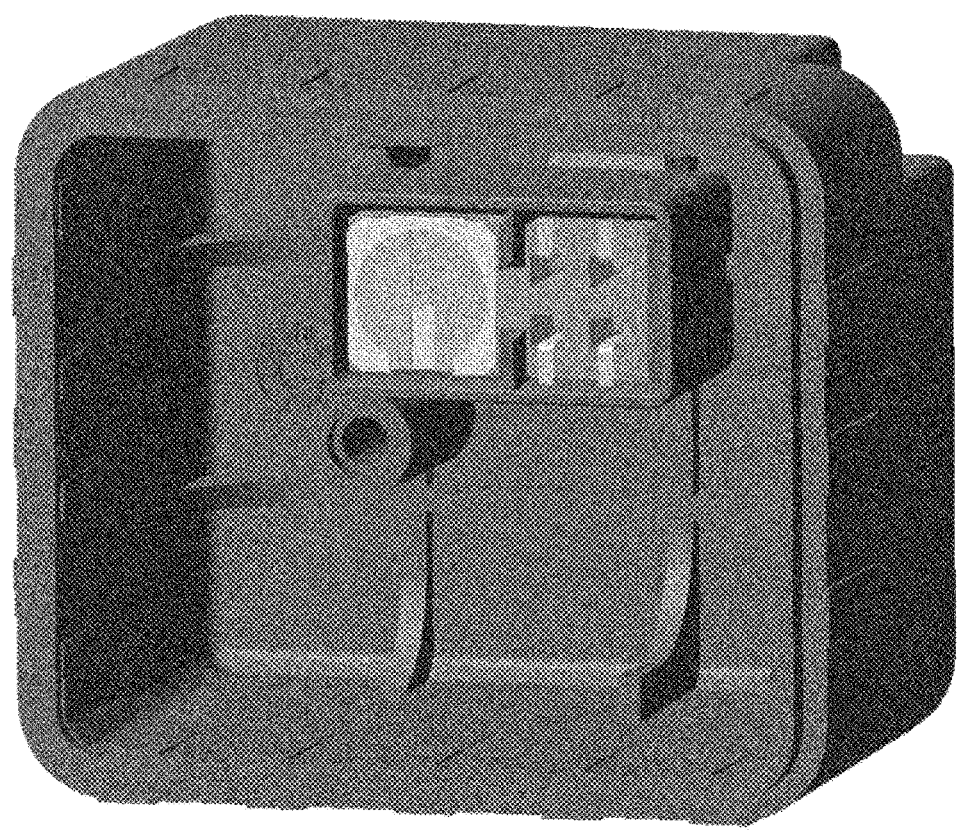
FIG. 33B is a perspective view of a camera rear housing similar to FIG. 33A, with the connector SMD counter piece shown as it will interconnect with the rear housing upon assembly (but with the PCB not shown), with the SMD counter piece meant to be placed on the PCB.
Figure 33C:
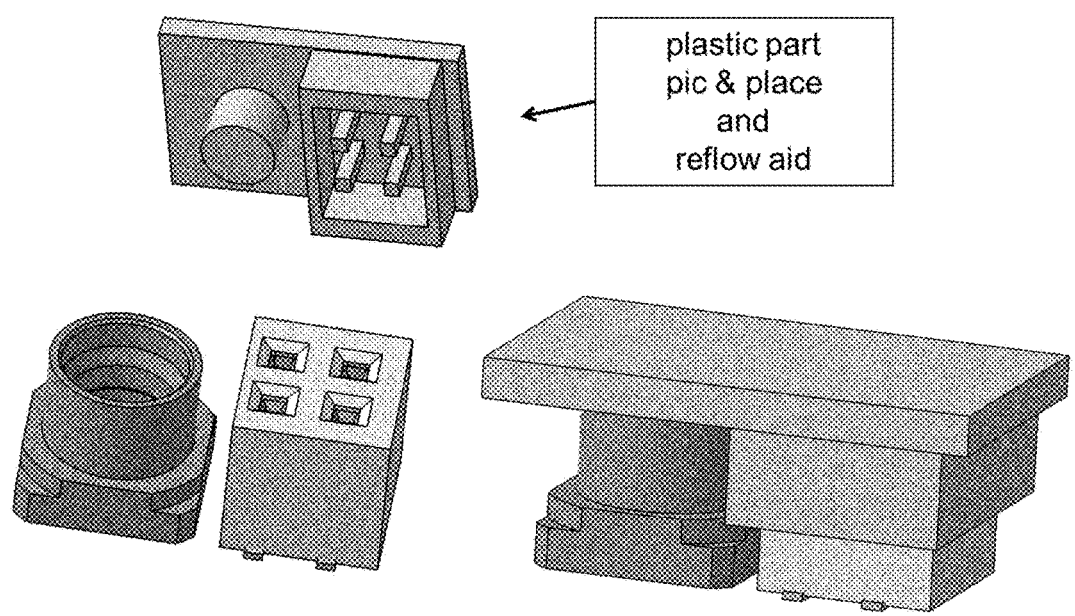
FIG. 33C shows the 'pick and place' aiding device for mounting the SMD connector mating pieces onto the PCB during assembly and reflow.
Figure 33D:
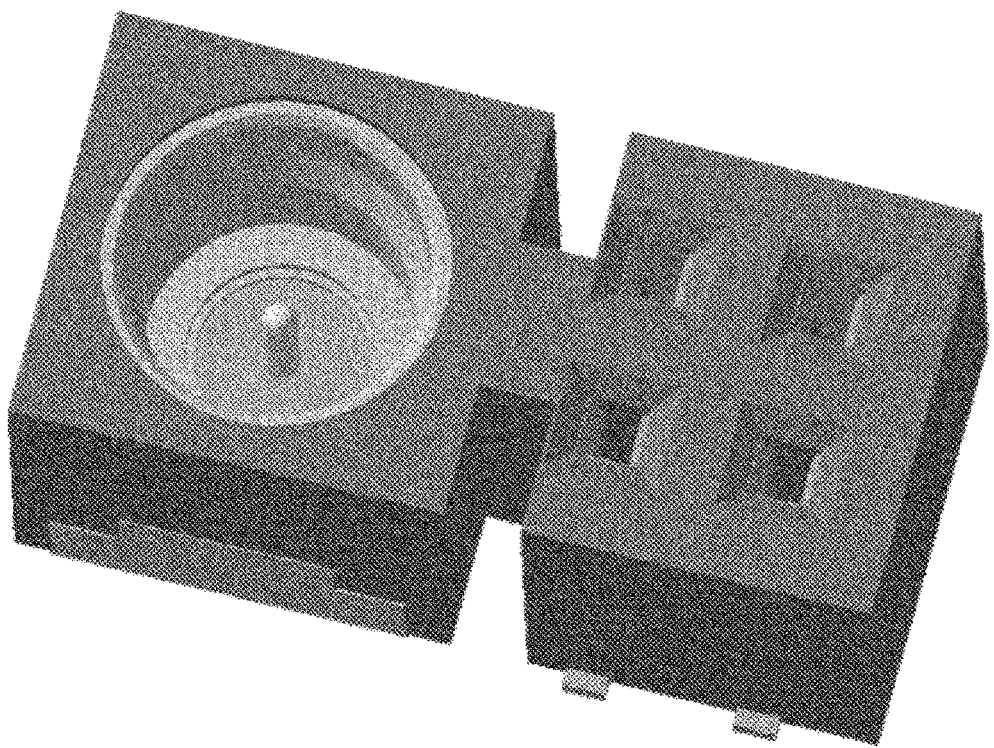
FIG. 33D is a perspective view of the connector side of the SMD counter piece shown from the SMD side in FIG. 33C.
Figure 33E:
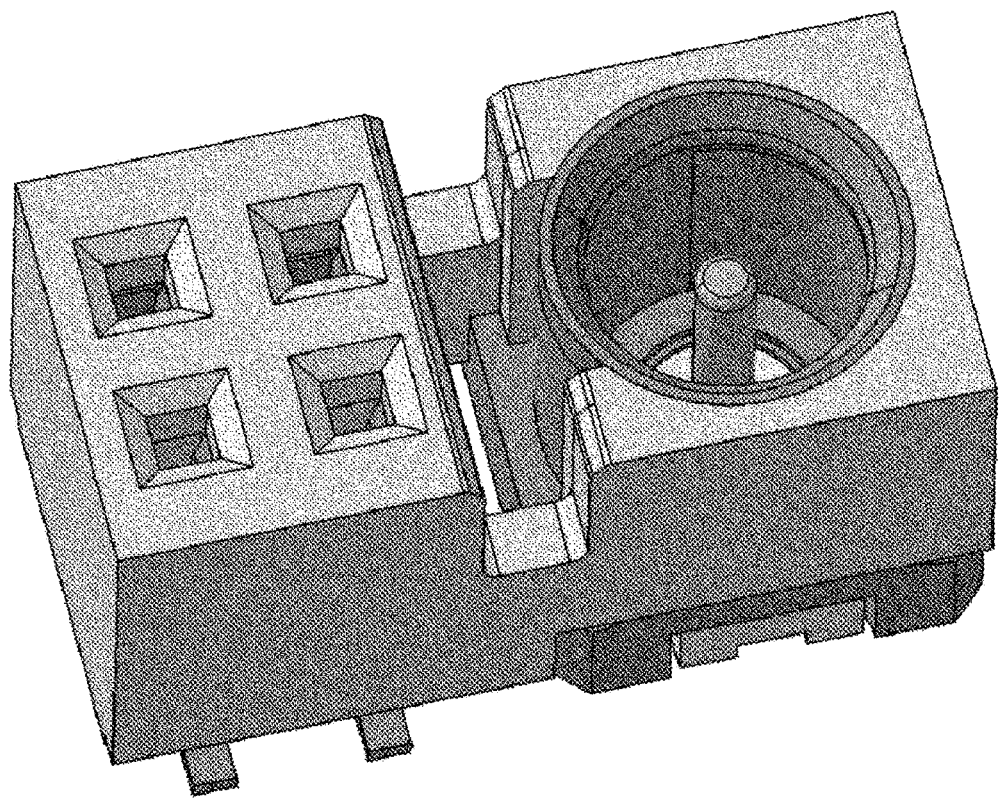
FIG. 33E is a perspective view of the bundled connector SMD counter piece similar to FIG. 33C, but with the bridges on the side for having space in the middle to embrace a wall of the housing with conducting surface having ground potential.
Figure 34:
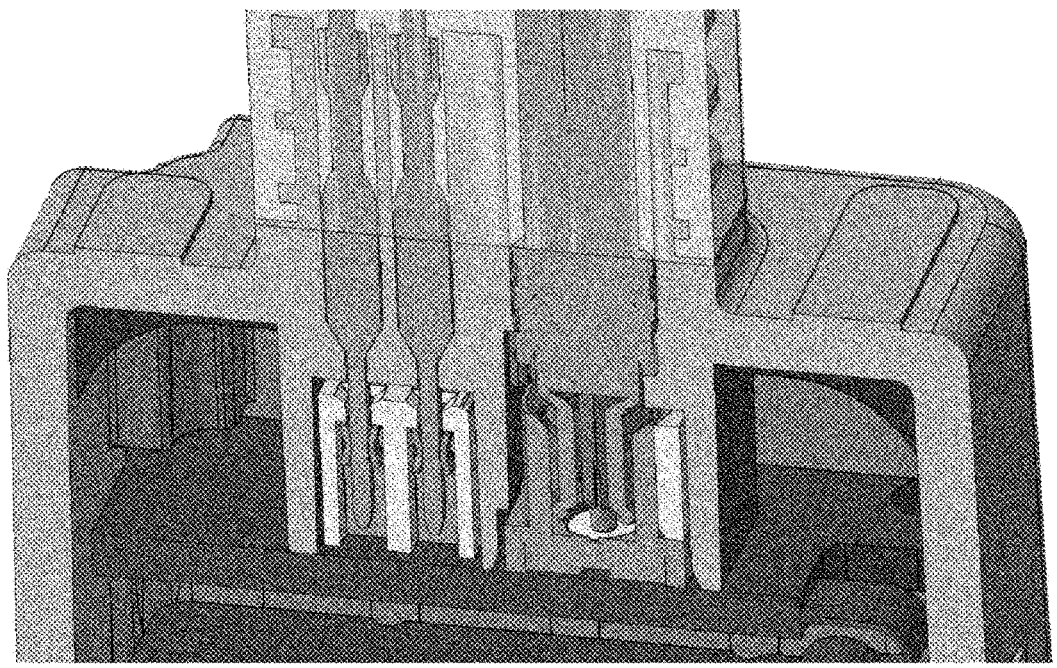
FIG. 34 is a sectional view of a readily assembled camera with the overmold for tightening and pull relief, with the coaxial cable plug extending out of the camera's rear housing into the (modified) PCB coaxial SMD header pin slot bundle assembled on it.

Different from the connectors described in U.S. Publication No. US-2015-0222795, in this optional solution neither the core contact nor the shielding contact on the PCB carrier has flexible properties but both contacts (shielding skirt and core pin) of the press fit coaxial connector reach from the housing towards the PCB carrier (shown in FIGS. 33B, 33C, 33D and 33E) or PCB coaxial slot (shown in FIGS. 30 and 31). Optionally, the area encircled by the PCB carrier's shield may be filled by air (or there may be a vacuum in applications where the camera may be encapsulated or air tight and assembled in a vacuum) or by a flexible dielectric material, such as a compressible or flexible foam, paste or gummy with a hole in the middle for the core pin. The examples of FIGS. 27 and 28 additionally show four additional non-coaxial press fit data pins, each of which has vertically flexible (spring) properties (FIG. 28) reaching onto a PCB pad, at which a conducting pad is applied at. The pads as well as the spring contacts may have a gold or silver surface for avoiding wear. A cross section of a full assembly of such a configuration is shown at FIG. 32. As an alternative more misalignment tolerant solution, the non-coaxial pins may be fixed pins reaching into a socket header with lateral flexible properties in which the contacts dive with flexible depths (FIG. 33A). The counter piece (of FIG. 33D), such as, for example, an SMD counter piece (connector mating piece), is meant to be placed on the PCB of FIG. 33B. A slightly modified version of the SMD header pin slot—coaxial slot bundle of FIG. 33D is shown in FIG. 33E. A similar alternative solution with two (different) mating pieces may be mounted under use of an additional pick and place aiding part (shown in FIG. 33C), which ensures the correct distance and orientation when placing the SMD counter connector (mating) parts onto the PCB prior to soldering or reflow and holding them in place during the soldering or reflow process. After that the pick and place aiding part will be removed.

The connection system of the present invention thus may have a coaxial connector that is press fit into a camera housing to connect to a PCB connector and separate flexible connectors or pins (that may be crimped onto individual wires or terminals or leads) that are inserted through the camera housing to connect to another PCB connector. Optionally, the housing may include shielding inside the housing between the coaxial part and the data wires. The PCB ground connection to metal may be achieved via one or more metal fasteners or screws, such as at or near to the coaxial area or at one or more corners of the PCB. With the connection of the present invention, there may be direct contact of the PCB header encapsulation to PCB ground.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system of a vehicle, said camera comprising:

a camera housing comprising a front housing portion and a rear housing portion;

wherein said front housing portion houses a lens and an imager;

wherein said front housing portion has a circuit board attached thereat;

wherein said rear housing portion has an outer side and an inner side that is separated from the outer side by a wall thickness of said rear housing portion;

wherein said rear housing portion comprises a rigid one-piece coaxial connecting element that extends through the wall thickness of said rear housing portion;

wherein a first portion of said coaxial connecting element extends outward from the outer side of said rear housing portion and a second portion of said coaxial connecting element extends inward from the inner side of said rear housing portion;

wherein said coaxial connecting element comprises (i) a first coaxial cable connector at a first end of said first portion of said coaxial connecting element that extends outward from the outer side of said rear housing portion and (ii) a second coaxial cable connector at a second end of said second portion of said coaxial connecting element that extends inward from the inner side of said rear housing portion;

wherein said circuit board has a third coaxial cable connector established thereat;

wherein said rear housing portion mates with said front housing portion to encase said circuit board in a cavity of said camera housing;

wherein, as said rear housing portion is mated with said front housing portion, said second coaxial cable connector engages said third coaxial cable connector to electrically connect said coaxial connecting element with circuitry at said circuit board; and wherein said first coaxial cable connector is configured to connect to a coaxial cable of the vehicle when said camera is disposed at the vehicle.

2. The camera of claim 1, wherein said coaxial connecting element comprises a bent coaxial connecting element whereby a longitudinal axis of said first coaxial cable connector is not parallel to a longitudinal axis of said second coaxial cable connector.

3. The camera of claim 1, wherein said coaxial connecting element comprises a straight coaxial connecting element whereby a longitudinal axis of said first coaxial cable connector is coaxial with a longitudinal axis of said second coaxial cable connector.

4. The camera of claim 1, wherein said coaxial connecting element is insert-molded in said rear housing portion.

5. The camera of claim 1, wherein said coaxial connecting element is press-fit into said rear housing portion.

6. The camera of claim 1, wherein said rear housing portion further comprises a multi-pin connector having a plurality of terminals, and wherein said plurality of terminals extend inward from the inner side of said rear housing portion to electrically connect to terminals of a header connector of said circuit board for electrically connecting to circuitry at said circuit board, and wherein said multi-pin connector is configured, at the outer side of said rear housing portion, to electrically connect to a plurality of terminals that electrically connects to a wire of the vehicle when said camera is disposed at the vehicle.

7. The camera of claim 6, wherein said coaxial connecting element and said multi-pin connector are formed adjacent one another as part of said rear housing portion.

8. The camera of claim 6, wherein said coaxial connecting element and said multi-pin connector are spaced apart from one another at said rear housing portion.

9. The camera of claim 6, wherein said coaxial connecting element and said multi-pin connector are at least in part molded at said rear housing portion.

10. The camera of claim 6, comprising an electrically conductive shield disposed at least partially around said header connector and in electrical connection with circuitry at said circuit board, and wherein a clamping element is configured to engage said electrically conductive shield when said terminals engage said header connector during assembly of said camera, and wherein connection of said clamping element and said electrically conductive shield provides enhanced grounding of said terminals of said multi-pin connector with circuitry at said circuit board.

11. The camera of claim 1, wherein a connecting end of the coaxial cable comprises a laterally flexible core pin, and wherein a dielectric element is disposed at least partially along said laterally flexible core pin to limit lateral movement of said laterally flexible core pin within said first coaxial cable connector of said coaxial connecting element when said first coaxial cable connector is connected to the coaxial cable.

12. The camera of claim 1, wherein a connecting end of the coaxial cable comprises a crimped ferule that is received in said first coaxial cable connector at said rear housing portion when said first coaxial cable connector is connected to the coaxial cable.

13. The camera of claim 1, wherein said first coaxial cable connector includes an inner connecting element and an outer connecting element that is electrically isolated from and at least partially circumscribes said inner connecting element of said first coaxial cable connector, and wherein said second coaxial cable connector includes an inner connecting element and an outer connecting element that is electrically isolated from and at least partially circumscribes said inner connecting element of said second coaxial cable connector, and wherein said third coaxial cable connector includes an inner connecting element and an outer connecting element that is electrically isolated from and at least partially circumscribes said inner connecting element of said third coaxial cable connector.

14. The camera of claim 13, wherein said inner connecting element of said second coaxial cable connector comprises a spring-loaded element that is biased towards an extended state to enhance electrical connection to said inner connecting element of said third coaxial cable connector at said circuit board when said rear housing portion is mated with said front housing portion.

15. The camera of claim 13, wherein said imager comprises at least 1 million photosensor elements arranged in rows and columns in a two dimensional array.

16. The camera of claim 15, wherein, when said camera is disposed at the vehicle and is operated, said imager captures image data for a surround view system of the vehicle.

17. A camera for a vision system of a vehicle, said camera comprising:

a camera housing comprising a front housing portion and a rear housing portion;

wherein said front housing portion houses a lens and an imager;

wherein said front housing portion has a circuit board attached thereat;

wherein said rear housing portion has an outer side and an inner side that is separated from the outer side by a wall thickness of said rear housing portion;

wherein said rear housing portion comprises a rigid one-piece coaxial connecting element that extends through the wall thickness of said rear housing portion;

wherein a first portion of said coaxial connecting element extends outward from the outer side of said rear housing portion and a second portion of said coaxial connecting element extends inward from the inner side of said rear housing portion;

wherein said coaxial connecting element comprises (i) a first coaxial cable connector at a first end of said first portion of said coaxial connecting element that extends outward from the outer side of said rear housing portion and (ii) a second coaxial cable connector at a second end of said second portion of said coaxial connecting element that extends inward from the inner side of said rear housing portion;

wherein said circuit board has a third coaxial cable connector established thereat;

wherein said third coaxial cable connector comprises a male coaxial cable connector and wherein said second coaxial cable connector comprises a female coaxial cable connector;

wherein said rear housing portion mates with said front housing portion to encase said circuit board in a cavity of said camera housing;

wherein, as said rear housing portion is mated with said front housing portion, said second coaxial cable connector engages said third coaxial cable connector to electrically connect said coaxial connecting element with circuitry at said circuit board; and wherein said first coaxial cable connector is configured to connect to a coaxial cable of the vehicle when said camera is disposed at the vehicle.

18. The camera of claim 17, wherein said coaxial connecting element comprises a bent coaxial connecting element whereby a longitudinal axis of said first coaxial cable connector is not parallel to a longitudinal axis of said second coaxial cable connector.

19. The camera of claim 17, wherein said coaxial connecting element comprises a straight coaxial connecting element whereby a longitudinal axis of said first coaxial cable connector is coaxial with a longitudinal axis of said second coaxial cable connector.

20. The camera of claim 17, wherein said coaxial connecting element is insert-molded in said rear housing portion.

21. The camera of claim 17, wherein said coaxial connecting element is press-fit into said rear housing portion.

22. The camera of claim 17, wherein said first coaxial cable connector includes an inner connecting element and an outer connecting element that is electrically isolated from and at least partially circumscribes said inner connecting element of said first coaxial cable connector, and wherein said second coaxial cable connector includes an inner connecting element and an outer connecting element that is electrically isolated from and at least partially circumscribes said inner connecting element of said second coaxial cable connector, and wherein said third coaxial cable connector includes an inner connecting element and an outer connecting element that is electrically isolated from and at least partially circumscribes said inner connecting element of said third coaxial cable connector.

23. The camera of claim 22, wherein, as said rear housing portion is mated with said front housing portion, said inner connecting element of said third coaxial cable connector is received in said inner connecting element of said second coaxial cable connector.

24. A camera for a vision system of a vehicle, said camera comprising:

a camera housing comprising a front housing portion and a rear housing portion;

wherein said front housing portion houses a lens and an imager;

wherein said front housing portion has a circuit board attached thereat;

wherein said rear housing portion has an outer side and an inner side that is separated from the outer side by a wall thickness of said rear housing portion;

wherein said rear housing portion comprises a rigid one-piece coaxial connecting element that extends through the wall thickness of said rear housing portion;

wherein a first portion of said coaxial connecting element extends outward from the outer side of said rear housing portion and a second portion of said coaxial connecting element extends inward from the inner side of said rear housing portion;

wherein said coaxial connecting element comprises (i) a first coaxial cable connector at a first end of said first portion of said coaxial connecting element that extends outward from the outer side of said rear housing portion and (ii) a second coaxial cable connector at a second end of said second portion of said coaxial connecting element that extends inward from the inner side of said rear housing portion;

wherein said circuit board has a third coaxial cable connector established thereat;

wherein said third coaxial cable connector comprises a female coaxial cable connector and wherein said second coaxial cable connector comprises a male coaxial cable connector;

wherein said rear housing portion mates with said front housing portion to encase said circuit board in a cavity of said camera housing;

wherein, as said rear housing portion is mated with said front housing portion, said second coaxial cable connector engages said third coaxial cable connector to electrically connect said coaxial connecting element with circuitry at said circuit board; and wherein said first coaxial cable connector is configured to connect to a coaxial cable of the vehicle when said camera is disposed at the vehicle.

25. The camera of claim 24, wherein said coaxial connecting element comprises a bent coaxial connecting element whereby a longitudinal axis of said first coaxial cable connector is not parallel to a longitudinal axis of said second coaxial cable connector.

26. The camera of claim 24, wherein said coaxial connecting element comprises a straight coaxial connecting element whereby a longitudinal axis of said first coaxial cable connector is coaxial with a longitudinal axis of said second coaxial cable connector.

27. The camera of claim 24, wherein said coaxial connecting element is insert-molded in said rear housing portion.

28. The camera of claim 24, wherein said coaxial connecting element is press-fit into said rear housing portion.

29. The camera of claim 24, wherein said first coaxial cable connector includes an inner connecting element and an outer connecting element that is electrically isolated from and at least partially circumscribes said inner connecting element of said first coaxial cable connector, and wherein said second coaxial cable connector includes an inner connecting element and an outer connecting element that is electrically isolated from and at least partially circumscribes said inner connecting element of said second coaxial cable connector, and wherein said third coaxial cable connector includes an inner connecting element and an outer connecting element that is electrically isolated from and at least partially circumscribes said inner connecting element of said third coaxial cable connector.

30. The camera of claim 29, wherein, as said rear housing portion is mated with said front housing portion, said inner connecting element of said second coaxial cable connector is received in said inner connecting element of said third coaxial cable connector.

\* \* \* \* \*